(12) United States Patent
Bernick et al.

(10) Patent No.: US 7,426,656 B2
(45) Date of Patent: Sep. 16, 2008

(54) METHOD AND SYSTEM EXECUTING USER PROGRAMS ON NON-DETERMINISTIC PROCESSORS

(75) Inventors: David L. Bernick, Ben Lomond, CA (US); William F. Bruckert, Los Gatos, CA (US); David J. Garcia, Los Gatos, CA (US); Robert L. Jardine, Cupertino, CA (US); James S. Klecka, Georgetown, TX (US); Pankaj Mehra, San Jose, CA (US); James R. Smullen, Carmel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

(21) Appl. No.: 11/042,548

(22) Filed: Jan. 25, 2005

(65) Prior Publication Data

US 2005/0223274 A1 Oct. 6, 2005

Related U.S. Application Data

(60) Provisional application No. 60/557,812, filed on Mar. 30, 2004.

(51) Int. Cl.
*G06F 11/00* (2006.01)
(52) U.S. Cl. .......................... 714/12; 714/11
(58) Field of Classification Search ................ None
See application file for complete search history.

(56) References Cited

U.S. PATENT DOCUMENTS

| | | | |
|---|---|---|---|
| 3,665,404 A | 5/1972 | Werner | |
| 5,016,249 A | 5/1991 | Hurst et al. | |
| 5,193,175 A * | 3/1993 | Cutts et al. | 714/11 |
| 5,226,152 A | 7/1993 | Klug et al. | |
| 5,239,641 A | 8/1993 | Horst | |
| 5,255,367 A | 10/1993 | Bruckert et al. | |
| 5,291,608 A | 3/1994 | Flurry | |
| 5,317,726 A * | 5/1994 | Horst | 714/12 |
| 5,369,767 A | 11/1994 | Dinwiddie, Jr. et al. | |
| 5,384,906 A | 1/1995 | Horst | |
| 5,452,443 A | 9/1995 | Oyamada et al. | |
| 5,504,859 A | 4/1996 | Gustafson et al. | |
| 5,535,397 A | 7/1996 | Durante et al. | |
| 5,600,784 A | 2/1997 | Bissett et al. | |
| 5,613,127 A * | 3/1997 | Schultz | 713/502 |
| 5,615,403 A | 3/1997 | Bissett et al. | |
| 5,751,955 A | 5/1998 | Sonnier et al. | |
| 5,790,397 A | 8/1998 | Bissett et al. | |
| 5,850,555 A | 12/1998 | Qureshi et al. | |
| 5,896,523 A | 4/1999 | Bissett et al. | |
| 5,956,474 A | 9/1999 | Bissett et al. | |
| 5,991,900 A | 11/1999 | Garnett | |

(Continued)

OTHER PUBLICATIONS

Microsoft Computer Dictionary, 4th Ed. Microsoft Pres, 1999, p. 246.*

*Primary Examiner*—Christopher S McCarthy

(57) ABSTRACT

A method and system of loosely lock-stepped non-deterministic processors. Some exemplary embodiments may be a processor-based method comprising executing fault tolerant copies of a user program, one copy of the user program executed in a first processor performing non-deterministic execution, and a duplicate copy of the user program executing in a second processor performing non-deterministic execution, with the executing in the first processor and second processor not in cycle-by-cycle lock-stepped.

25 Claims, 12 Drawing Sheets

U.S. PATENT DOCUMENTS

| | | |
|---|---|---|
| 6,038,685 A | 3/2000 | Bissett et al. |
| 6,195,715 B1 | 2/2001 | Hoge et al. |
| 6,223,304 B1 * | 4/2001 | Kling et al. .................. 714/12 |
| 6,240,526 B1 * | 5/2001 | Petivan et al. ................. 714/11 |
| 6,279,119 B1 * | 8/2001 | Bissett et al. ................. 714/12 |
| 6,327,668 B1 | 12/2001 | Williams |
| 6,393,582 B1 | 5/2002 | Klecka et al. |
| 6,473,869 B2 | 10/2002 | Bissett et al. |
| 6,604,177 B1 | 8/2003 | Kondo et al. |
| 6,928,583 B2 * | 8/2005 | Griffin et al. ................. 714/11 |
| 6,948,092 B2 | 9/2005 | Kondo et al. |
| 6,983,337 B2 | 1/2006 | Diamant |
| 7,194,671 B2 | 3/2007 | Tu et al. |
| 7,308,605 B2 * | 12/2007 | Jardine et al. ................. 714/11 |
| 2002/0026604 A1 * | 2/2002 | Bissett et al. ................. 714/12 |
| 2002/0133751 A1 | 9/2002 | Nair et al. |
| 2002/0152418 A1 * | 10/2002 | Griffin et al. .................. 714/11 |
| 2002/0152419 A1 * | 10/2002 | McLoughlin et al. ......... 714/11 |
| 2003/0188221 A1 * | 10/2003 | Rasmussen et al. .......... 714/11 |
| 2003/0191983 A1 * | 10/2003 | Mann et al. ................... 714/11 |
| 2005/0223302 A1 | 10/2005 | Bono |
| 2006/0168434 A1 | 7/2006 | Del Vigna, Jr. et al. |

* cited by examiner

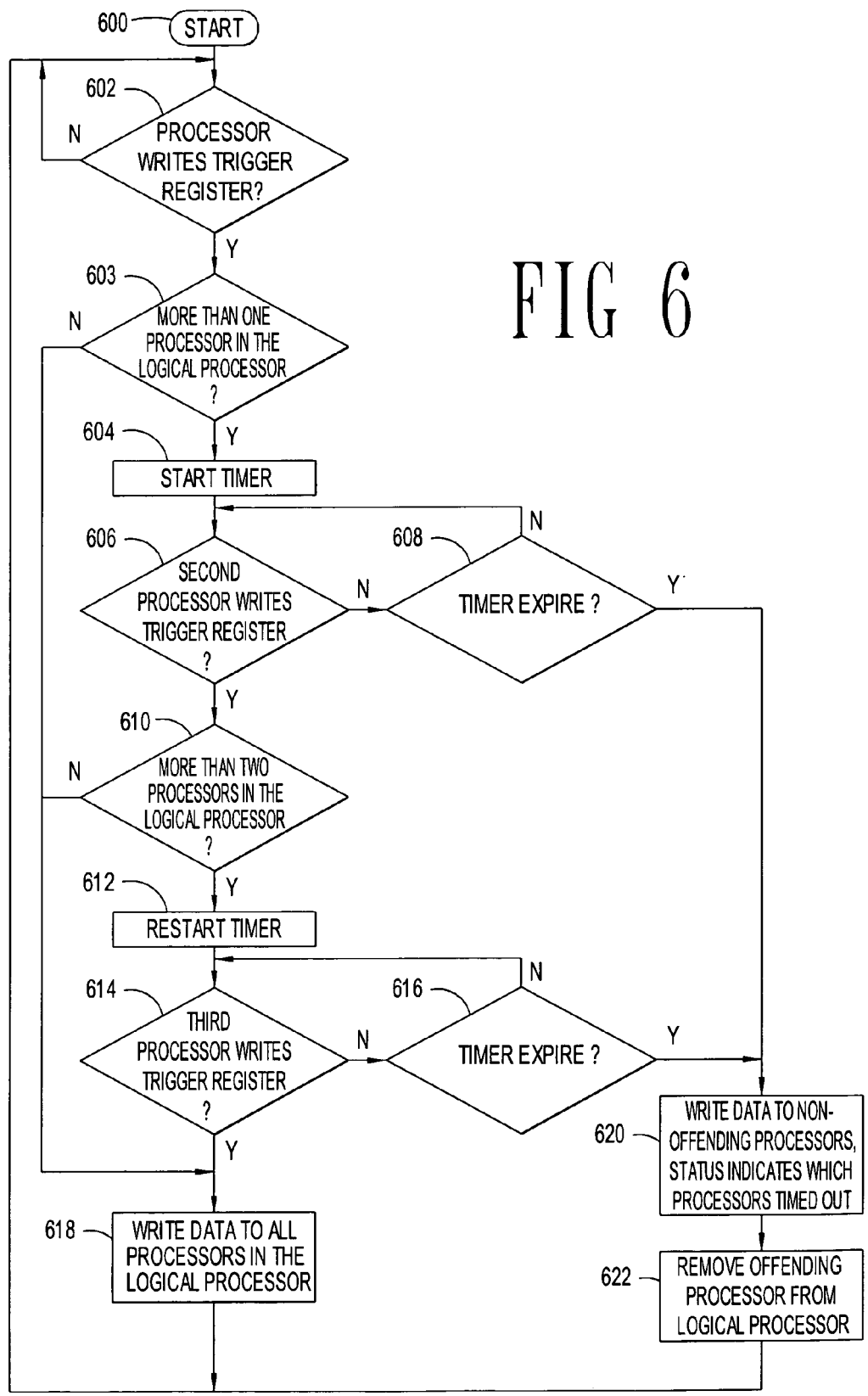

METHOD AND SYSTEM EXECUTING USER PROGRAMS ON NON-DETERMINISTIC PROCESSORS

CROSS-REFERENCE TO RELATED APPLICATIONS

This application claims the benefit of provisional application Ser. No. 60/557,812, filed Mar. 30, 2004, which is incorporated by reference herein as if reproduced in full below. Further, this application is related to concurrently filed applications: application Ser. No. 11/042,429, titled, "Method and System of Servicing Asynchronous Interrupts in Multiple Processors Executing a User Program"; application Ser. No. 11/042,985, titled, "Method and System of Exchanging Information Between Processors"; and application Ser. No. 11/042,981, titled, "Method and System of Determining Whether a User Program Has Made a System Level Call."

BACKGROUND

At least two types of computing faults may be of concern to computer system designers. A first fault may be the failure of hardware, such as the failure of a processor or an unrecoverable memory error. A second fault may be a computational fault, such as may be caused by cosmic radiation changing the state of a bit in hardware. In order for the computer system to remain operational following a failure of hardware or to detect and recover from a computational fault, some computing systems have multiple processors executing the same software applications. In the event one of the processors experiences a failure of hardware, the computing continues with the one or more processors still functioning properly. Comparison of outputs of the multiple processors may allow detection and correction of computational faults.

In some cases the processors executing the same software application operate in cycle-by-cycle or strict lock-step, each processor provided a duplicate clocking signal and executing cycle-by-cycle the same software code. While processor clocking frequencies have increased, so too has the die size. Increased clock frequency, in combination with larger die sizes, makes it difficult to control phase differences in the clocking signals of computer systems, and therefore also difficult to implement strict lock-step. Further difficulties may include handling of recoverable errors (soft errors) that occur in one processor, but not others. To address these difficulties, some computer manufacturers may implement loose lock-step systems where processors execute the same code, but not necessarily in a cycle-by-cycle fashion or at the same wall clock time. In order to ensure that processors executing the same code do not get too far removed from one another, these systems count executed instructions and, after expiration of a predetermined number of instructions, synchronize by stalling the faster processor to allow the slower processor to catch up.

However, emerging technology in processor design allows non-deterministic processor execution. Non-deterministic processor execution may mean that multiple processors provided the same software application instructions will not necessarily execute the instructions in the same order, or using the same number of steps. The differences may be attributable to advances such as speculative execution (such as branch prediction), out of order processing, and soft error recovery implemented within the processor. Thus, two or more processors executing the same software application may not perform precisely the same sequence of instructions, and therefore strict lock-step fault tolerance, as well as loose lock-step fault tolerance relying on counting of retired instructions, may not be possible.

BRIEF DESCRIPTION OF THE DRAWINGS

For a detailed description of exemplary embodiments of the invention, reference will now be made to the accompanying drawings in which:

FIG. 6 illustrates a flow diagram that may be implemented within a synchronization logic in accordance with embodiments of the invention;

NOTATION AND NOMENCLATURE

Certain terms are used throughout the following description and claims to refer to particular system components. As one skilled in the art will appreciate, computer manufacturing companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
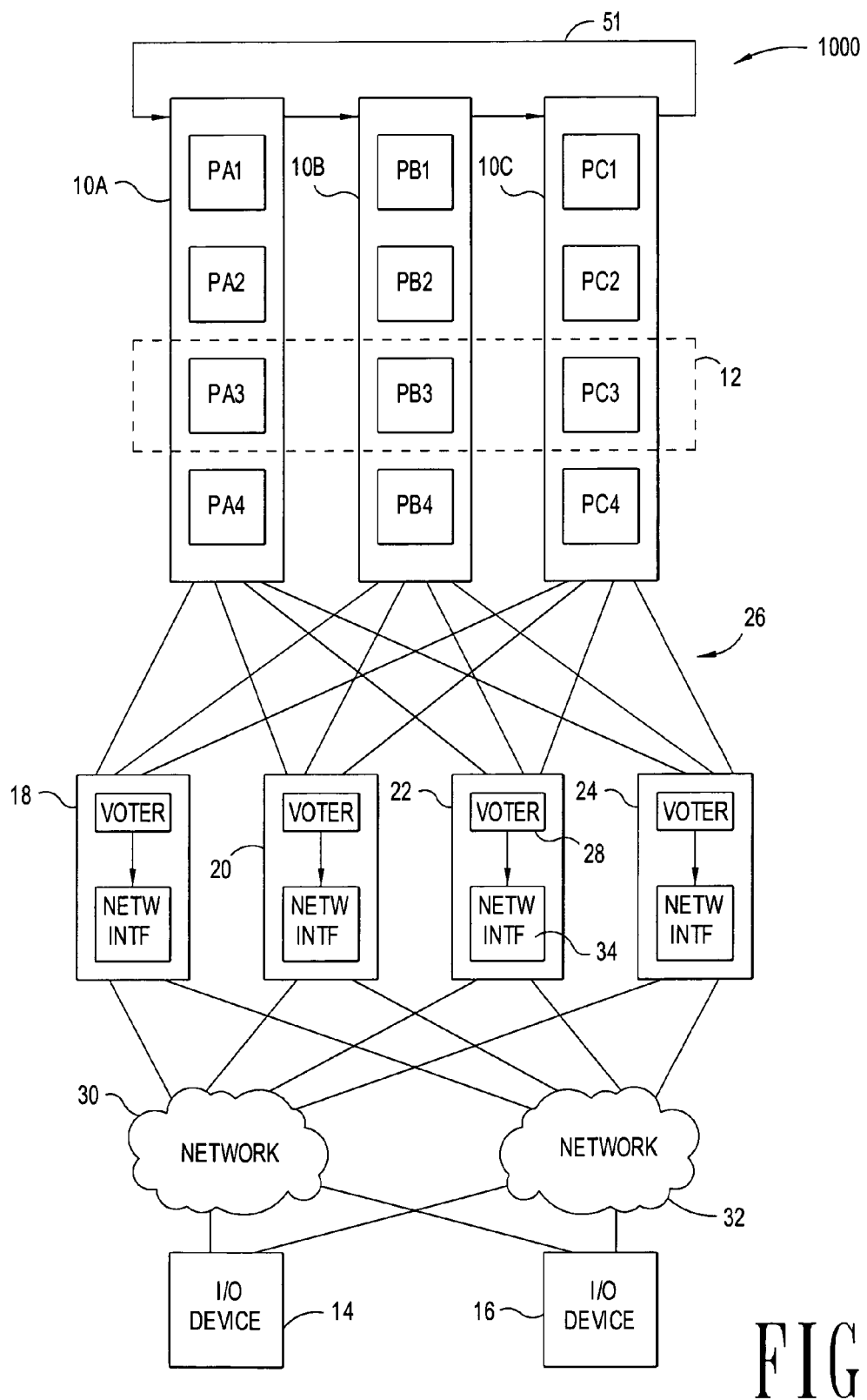
FIG. 1 illustrates a computing system in accordance with embodiments of the invention.

FIG. 1 illustrates a computing system 1000 in accordance with embodiments of the invention. In particular, the computing system 1000 may comprise a plurality of multiprocessor computer systems 10. In some embodiments, only two multiprocessor computer systems 10 may be used, and as such the computing system 1000 may implement a dual-modular redundant (DMR) system. As illustrated in FIG. 1, the computing system 1000 comprises three multiprocessor computer systems 10, and therefore implements a tri-modular redundant (TMR) system. Regardless of whether the computer system is dual-modular redundant or tri-modular redundant, the computing system 1000 implements fault tolerance by redundantly executing user programs across the multiprocessor computer systems.

In accordance with embodiments of the invention, each multiprocessor computer system 10 preferably comprises one or more processors, and as illustrated in FIG. 1 four processors. Each processor of FIG. 1 has a leading "P," indicating a processor. Further, each processor is given a letter designation of "A," "B," or "C," to indicate the processor's physical location within one of the multiprocessor computer systems 10A, 10B and 10C respectively. Finally, each processor is given a numerical designation to indicate that processor's location within each multiprocessor computer system. Thus, for example, the processors in multiprocessor computer system 10A have designations "PA1," "PA2," "PA3," and "PA4."

In accordance with embodiments of the invention, at least one processor from each multiprocessor computer system 10 may be logically grouped to form a logical processor 12. In the illustrative embodiments of in FIG. 1, processors PA3, PB3, and PC3 are grouped to form the logical processor 12. In accordance with embodiments of the invention, each processor within a logical processor substantially simultaneously executes duplicate copies of a user program, thus implementing fault tolerance. More particularly, each processor within a logical processor is provided the same instruction stream for the user programs and computes the same results (assuming no errors), but the processors within the logical processor are not in cycle-by-cycle or strict lock-step; rather, the processors are loosely lock-stepped, with synchronization and handling of interrupts occurring based on rendezvous points (discussed below). In accordance with some embodiments, the processors may have non-deterministic execution, and thus strict lock-step may not be possible. In the event one of the processors fails, the one or more remaining processors may continue without affecting overall system performance.

Inasmuch as there may be two or more processors within a logical processor executing the same user program, duplicate reads and writes may be generated, such as reads and writes to input/output (I/O) devices 14 and 16. The I/O devices 14 and 16 may be any suitable I/O device, e.g., a network interface card, a floppy drive, a hard disk drive, a CD ROM drive and/or a keyboard. In order to compare the reads and writes for purposes of fault detection, each logical processor has associated therewith a synchronization logic. For example, processors PA1, PB1 and PC1 may form a logical processor associated with synchronization logic 18. Likewise, the processors PA2, PB2 and PC2 may form a logical processor associated with synchronization logic 20. The logical processor 12 may be associated with synchronization logic 22. Finally, processors PA4, PB4 and PC4 may form a logical processor associated with synchronization logic 24. Thus, each multiprocessor computer system 10 may couple one each to each of the synchronization logics 18, 20, 22 and 24 by way of an interconnect 26. The interconnect 26 may be a Peripheral Component Interconnected (PCI) bus, and in particular a serialized PCI bus, although other bus and/or network communication schemes may be equivalently used.

Each synchronization logic 18, 20, 22 and 24 comprises a voter logic unit, e.g., voter logic 28 of synchronization logic 22. The following discussion, while directed to voter logic 28 of synchronization logic 22, is equally applicable to each voter logic unit in each of the synchronization logics 18, 20, 22 and 24. The voter logic 28 acts to consolidate read and write requests from the processors, and plays a role in the exchange of information between processors. Consider for purposes of explanation each processor in logical processor 12 executing its copy of a user program, and that each processor generates a read request to network interface 34. Each processor of logical processor 12 sends its read request to the voter logic 28. The voter logic 28 receives each read request, compares the read requests, and (assuming the read requests agree) issues a single read request to the network interface 34.

In response to the single read request issued by a synchronization logic, the illustrative network interface 34 returns the requested information to the voter logic 28. In turn, the voter logic replicates and passes the requested information to each of the processors of the logical processor. Likewise, for other input/output functions, such as writes and transfer of packet messages to other programs (possibly executing on other logical processors), the synchronization logic ensures that the requests match, and then forwards a single request to the appropriate location. In the event that any one processor in a logical processor does not function properly (e.g., fails to generate a request, fails to generate a request within a specified time, generates a non-matching request, or fails completely), the user program may continue based on requests of the remaining processor or processors of the logical processor. Likewise for externally generated communications, the synchronization logic duplicates the external communication and provides the communication to each processor. In the case of externally generated requests for direct memory access (also known as remote DMA), the synchronization logic duplicates the requests for distribution, and compares and consolidates data provided by each processor based on those requests.

In addition to consolidating reads and writes to external interfaces (such as network interface 34), and duplicating messages and data from those external interfaces, synchronization logics also play a role in ensuring each processor is provided the same time of day when a request for that information is made. In particular, user programs may at certain points in their execution make system calls requesting time of day information. A system call is any call to a privileged program (executed in a higher privileged mode than a user mode), such as operating system programs. A system call to obtain time of day information is only one example of the family of programs that fall within the category of system calls, and the role of system calls in synchronizing user programs between processors in a logical processor and handling interrupts will be discussed more fully below. In order that each user program is provided the same time of day at corresponding execution points in the user program (in spite of the differences in wall clock time when those execution points are reached), synchronization logics in accordance with embodiments of the invention provide the time of day information to each processor in a logical processor. That is, as part of the process of scheduling a point in each user program in each processor to service interrupts (discussed more thoroughly below), the synchronization logics provide time of day information to each processor. Rather than internally deriving time of day when a user program so requests, time of day system calls in accordance with embodiments of the invention utilize the most recent time of day information provided by the synchronization logics. In this way, each user program is provided the same time of day information independent of whether the user programs are executing at precisely the same wall clock time.

Figure 2:
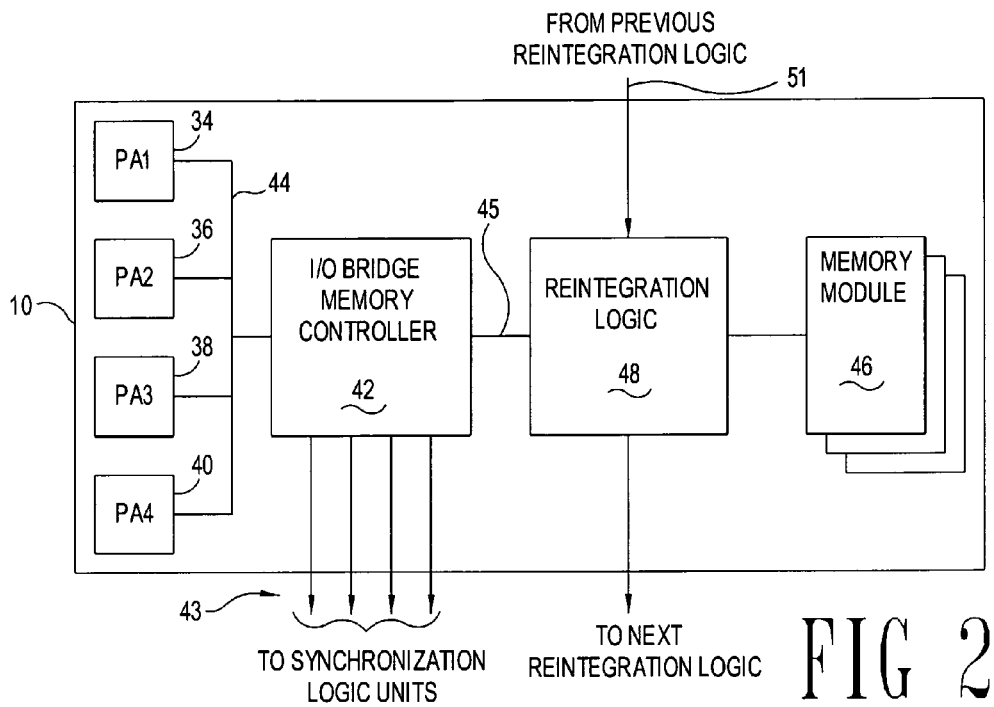
FIG. 2 illustrates in greater detail a computing system in accordance with embodiments of the invention.

FIG. 2 illustrates in greater detail a multiprocessor computer system 10. In particular, FIG. 2 illustrates that a multiprocessor computer system 10 in accordance with embodiments of the invention may have a plurality of processors, in the illustrative case of FIG. 2 four such processors 34, 36, 38 and 40. While only four processors are shown, any number of processors may be used without departing from the scope and spirit of the invention. The processors 34-40 may be individually packaged processors, processor packages comprising two or more processor dies within a single package, or multiple processors on a single die. Each of the processors may couple to an I/O bridge and memory controller 42 (hereinafter I/O bridge 42) by way of a processor bus 44. The I/O bridge 42 couples the processors 34-40 to one or more memory modules 46 by way of a memory bus 45. Thus, the I/O bridge 42 controls reads and writes to the memory area defined by the one or more memory modules 46. The I/O bridge 42 also allows each of the processors 34-40 to couple to synchronization logics (not shown in FIG. 2), as illustrated by bus lines 43.

Still referring to FIG. 2, the memory defined by the one or more memory modules 46 may be partitioned, one partition for each processor, therefore allowing each of the processors to operate independently. In alternative embodiments, each processor may have its own integrated memory controller, and thus each processor may have its own dedicated memory, and this too would be within the contemplation of the invention. The computing system 1000, of which the multiprocessor computer system 10 may form a part, implements loosely lock-stepped execution of user programs among processors within a logical processor. Loosely lock-stepped may mean that that each processor of a logical processor (e.g., logical processor 12) may execute a duplicate copy of a user program, but the instructions need neither be executed in a strict lock-step fashion, nor executed at the same wall clock time. Thus, the processors 34-40 may be of various architectures, including (but not limited to) non-deterministic processors which may not be suitable for strict lock-step execution or on counting retired instructions. Intel's® Itanium® processor family (IPF) is one example of a family of processors that performs non-deterministic execution and therefore is not suitable for strict lock-step execution or on counting retired instructions.

FIG. 2 further shows that each multiprocessor computer system 10 comprises a reintegration logic 48 coupled between the I/O bridge 42 and the memory modules 46. The illustrative embodiments of FIG. 1 show the interconnections of the reintegration logics (line 51) in the form of a ring, but any network topology may be equivalently used (e.g., ring, tree, dual rings, fully connected). In operation, the reintegration logic 48 is transparent to the I/O bridge 42, and does not interfere with reads and writes to the one or more memory modules 46. However, in the event that one processor within a logical processor experiences a fault and needs to be restarted, the reintegration logic 48 plays a role.

When restarting a processor it is desirable to begin execution of the user program at the same point as the processors in the logical processor which did not experience an error. Stated otherwise, the restarted processor may pick up at the point the other processors have reached in the user program rather than where the processor experienced a transient failure or hardware error. In the embodiments illustrated in FIG. 2, the reintegration logic 48 in each multiprocessor computer system 10 duplicates the memory from a memory of a non-failed multiprocessor computer system that did not experience an error of one of its processors. Thus, referring again to FIG. 1, line 51 illustrates that each of the multiprocessor computer systems 10 have their reintegration logics 48 coupled together to facilitate the duplication of memory partitions so that restarted multiprocessor computer systems may begin from the same state as other processors in the logical partition. Duplication of the entire memory, and subsequent restarting of all the processors in a multiprocessor computer system because of the failure of one processor in the system, may be dictated by having only a single memory controller (I/O bridge) 42. In alternative embodiments, there may be a plurality of memory controllers (e.g., one each for each processor), and thus only a portion of the memory may need to be duplicated (i.e., those memory partitions that correspond to the memory controller used by the processor that requires restarting), and likewise only a portion of the processors may need to be restarted (i.e., those that are associated with the memory that was duplicated).

In a loosely lock-stepped system, the reasons a processor may lead or lag may be many. For example, while each processor may execute instructions at substantially the same clock frequency, even minor differences in actual clock frequency may result in substantial differences over time (timing nondeterminism). Moreover, processors implemented in accordance with at least some embodiments of the invention have non-deterministic execution, and thus even provided precisely the same user program the processors may diverge greatly in the number of executing steps to arrive at a common point in the user program. Further still, some processors could encounter data access delays and/or fixable errors (non-architecturally visible state nondeterminism). Some examples may be: one processor may experience a cache miss that other processors may not experience; one processor may experience a correctable memory error, thus requiring execution of a recovery routine not needed by the remaining processors; and one processor may experience a miss of the translation look-aside buffer, causing additional processing but not affecting final outcome of the user program. Again, while the processors eventually arrive at the same execution point in the user program, the number of instructions executed and the time required to execute those instructions may not be the same.

With the idea in mind that processors of a logical processor may be executing the same instruction stream, but may not be at the same point in the instruction stream, the discussion turns to handling of interrupts in such an environment. Even if the same interrupt is asserted to each processor at precisely the same wall clock time, by virtue of the loosely lock-stepped execution of their respective processors the interrupts may not be asserted at the same execution point of the user program. The difficulty is further exacerbated by the fact that interrupt assertion itself is asynchronous. In order to ensure proper operation, each processor within a logical processor needs to service interrupts at the same execution point in the instruction stream of the user program. Ensuring interrupts are serviced at the same execution point in the instruction stream is accomplished in accordance with embodiments of the invention by utilizing the synchronization logic as a mechanism to agree on a rendezvous point at which to service the interrupt.

Figure 3:
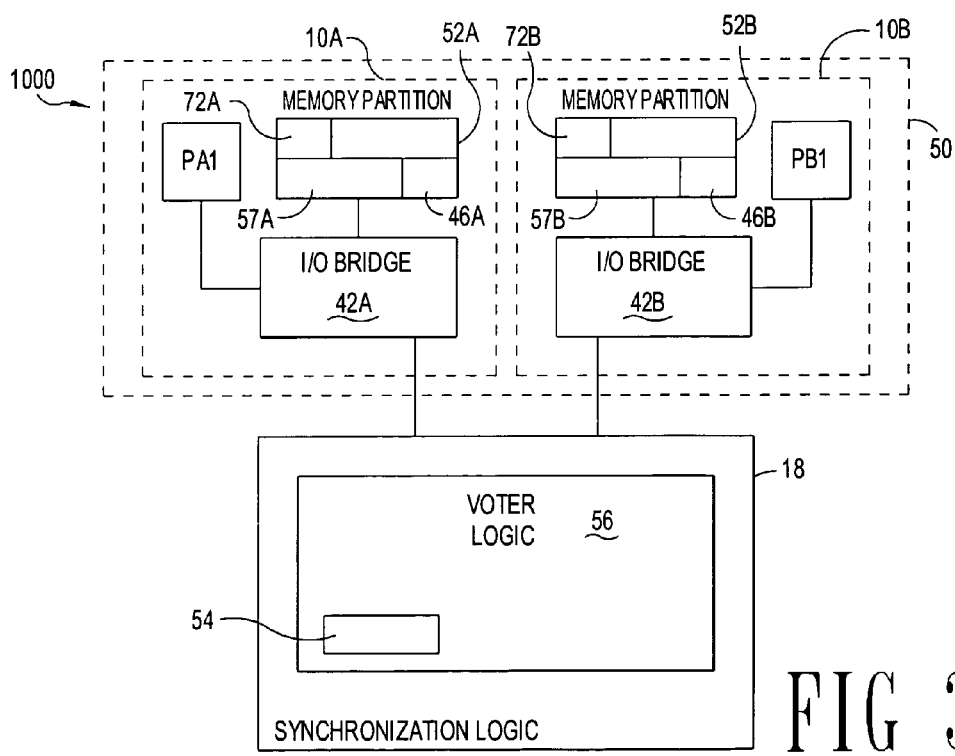
FIG. 3 illustrates a partial computing system in accordance with embodiments of the invention.

In accordance with embodiments of the invention, processors within a logical processor communicate with each other that: particular interrupts have been asserted; and a proposed point in the user program at which to suspend execution and to service the interrupt. Stated otherwise, processors in a logical processor agree on which interrupt to be serviced (or to be serviced first) and also agree on a point in the user program at which to service the interrupt. FIG. 3 illustrates a partial computing system 1000 in order to describe the operation of the various components that work together to coordinate servicing of interrupts. FIG. 3 is a simplified version of the system of FIG. 1 in the sense that the logical processor 50 in this case comprises only two processors PA1 and PB1. FIG. 3 is also, in another sense, more detailed than FIG. 1 inasmuch as FIG. 3 illustrates the memory partition 52 for each processor, and how the processor couples to the memory partition and the voter logic through the I/O bridge 42. Thus, the logical processor 50 of FIG. 3 comprises one processor each from the multiprocessor computer systems 10A and 10B. Processor PA1 couples to I/O bridge 42A, which in turn couples both to the synchronization logic 18 and PA1 processor's memory partition 52A. Processor PB1 couples to its respective I/O bridge 42B, which in turn couples to the synchronization logic 18 and PB1 processor's memory partition 52B.

In accordance with at least some embodiments, having the processors of a logical processor exchange information for purposes of establishing a rendezvous point involves each processor writing information to synchronization registers 54 in the voter logic 56 of the synchronization logic 18. A rendezvous point, in accordance with embodiments of the invention, may be any suitable location, such as: each time a dispatcher function of the operating system executes and sets other tasks to execution; traps and fault handlers; and system calls made by user programs. The term "system call" is used in this specification, and in the claims, to refer to any potential rendezvous point. A system call number may be a number which indicates how many system calls have been made from an arbitrary staring point. Location 72 of FIG. 3 illustrates a location in a memory partition 52 at which a system call number may reside. In alternative embodiments, the system call number may be equivalently stored in a register located other than in memory partition 52. In the embodiments illustrated in FIG. 3, the synchronization registers 54 are pre-designated memory locations, but any location where data may be written will suffice. After some or all of the processors have written their respective information, voter logic 56 writes the information in the synchronization registers 54 back to corresponding set of registers 57 in each of the memory partitions 52. The voter logic 56 may also write other information to the registers 57 during the write back operation, such as time of day information. Writing the information to the synchronization logic allows the processing of the user program to continue while waiting for the remaining processors to see the interrupt. In alternative embodiments, each processor may make a waited read to the memory locations in the synchronization registers 54, waiting meaning that the read will not complete until each processor writes the corresponding information regarding the interrupt. While the waited read as a byproduct may act to synchronize the processors, each processor waits in a software loop for the read to complete, and thus waited reads as a mechanism to exchange information regarding interrupts does not allow the user program to continue execution. Regardless of how the data exchange is performed, by exchanging information the processors within a logical processor coordinate at what point in the user program to service an interrupt.

Interrupts may be asserted to a processor at any time by way of packet-based messages containing interrupt information, or by way of dedicated interrupt signal lines. Interrupts may also be asserted to a processor from an internal source, such as a timer that is set to expire after some number of processor clock cycles. When such a packet, signal line or internal interrupt is received and detected by the processor, the user program is suspended and an interrupt handler routine is invoked. The purpose of the interrupt handler routine is to begin the process of identifying the rendezvous point. No action is taken with respect to the services requested by the interrupt by the interrupt handler routine. Rendezvous points (e.g., system calls) are the points at which the process of scheduling the rendezvous point is completed, and also scheduling programs to service the interrupts received.

Figure 4:
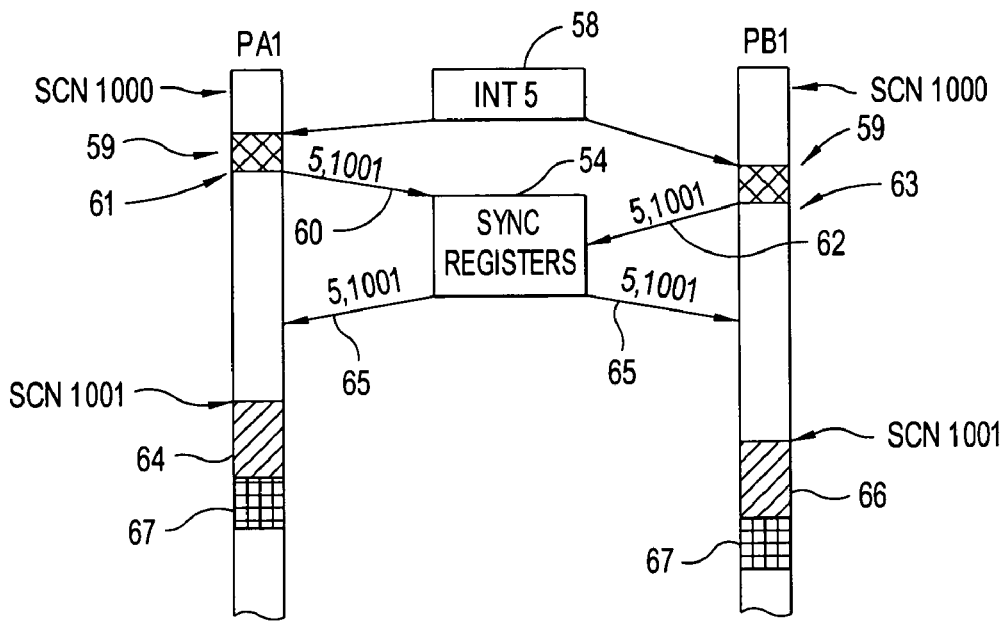
FIG. 4 illustrates an exemplary timeline in accordance with at least some embodiments of the invention.

FIG. 4 shows an illustrative timeline (with time increasing down the page) of a set of events in accordance with embodiments of the invention. The vertical bars underneath the references PA1 and PB1 represent, respectively, execution by those processors of programs. The blocks between the vertical lines represent hardware and/or events, and the lines between the central blocks and the vertical bars represent interaction of the various components as a function of time. Referring simultaneously to FIGS. 3 and 4, assume that each processor receives an interrupt (as indicated by block 58 and the arrows pointing to each of the vertical bars). As illustrated, the interrupt is asserted to each processor at different times. When the interrupt is received, the user program is suspended and interrupt handler routine is executed (as exemplified by cross-hatched area 59). The interrupt handler routine determines the nature of the interrupt, and writes information regarding the interrupt along with a proposed system call number at which to service the interrupt to the synchronization registers. The write of the interrupt information and proposed system call number is illustrated by line 60 exemplifying that processor PA1 received an interrupt 5, and that this processor proposes that the interrupt be serviced at system call number 1001. Likewise with respect to processor PB1, though the interrupt may be asserted at a slightly different time in the user program, an interrupt handler routine is executed soon thereafter (cross-hatched area 59), and the interrupt handler routine writes an indication to the synchronization registers 54 that an interrupt has been received and a proposed system call number at which to service the interrupt, as indicated by line 62. As soon as a interrupt handler routine completes its write to the synchronization registers, the user program continues execution (beginning at points 61 and 63).

Once all the processors within a logical processor have written their respective data to the synchronization registers 54, the voter logic 56 writes at least a portion of the information in the synchronization registers 54 to the corresponding registers 57 in the memory partition of each processor in the logical processor. In accordance with at least some embodiments of the invention, information from all processors is written back to each individual processor along with time of day information.

The system call number at which to service an interrupt is, in some embodiments, the highest system call number proposed by any of the processors within the logical processor. When each individual processor reaches the designated system call number (e.g., makes a time of day call whose system call number is the highest proposed system call number), the system call program of each individual processor places an interrupt service routine in its respective dispatch queue for execution, in addition to performing its designated task. Thus, processor PA1 executes the service routine for interrupt 5 (as indicated by shaded area 67) just after the execution of the previously determined system call number (in this case SCN 1001; indicated by shaded area 64 in the PA1 time line). Alternatively, the service routine may be performed immediately before the system call. At some time thereafter, the lagging processor PB1 reaches the previously determined system call number (SCN 1001), executes the system call (shaded area 66), and executes the interrupt service routine for the exemplary interrupt 5 (shaded area 67 in the PB1 time line). Thus, though both processors do not receive the interrupt at the same time, and the processors are only loosely lock-stepped, interrupts are serviced at the same point in the user program. Note that, as illustrated in FIG. 4, normal processing within each processor continues after the receipt of the interrupt and execution of the interrupt handler routine until the arrival at the system call number at which to execute the interrupt service routine. Note also that in the illustrative case of FIG. 4 the processors are minimally divergent in terms of their execution point of the user program, and thus in the illustrated method neither processor is stalled or slowed. The series of events illustrated in FIG. 4 is a simple case, and is presented to orient the reader to the nature of the interrupt handling in accordance with embodiments of the invention. Other cases are presented below after a more detailed description of the steps taken by the interrupt handler routine, as well as steps performed by system calls in accordance with embodiments of the invention.

Figure 5A:
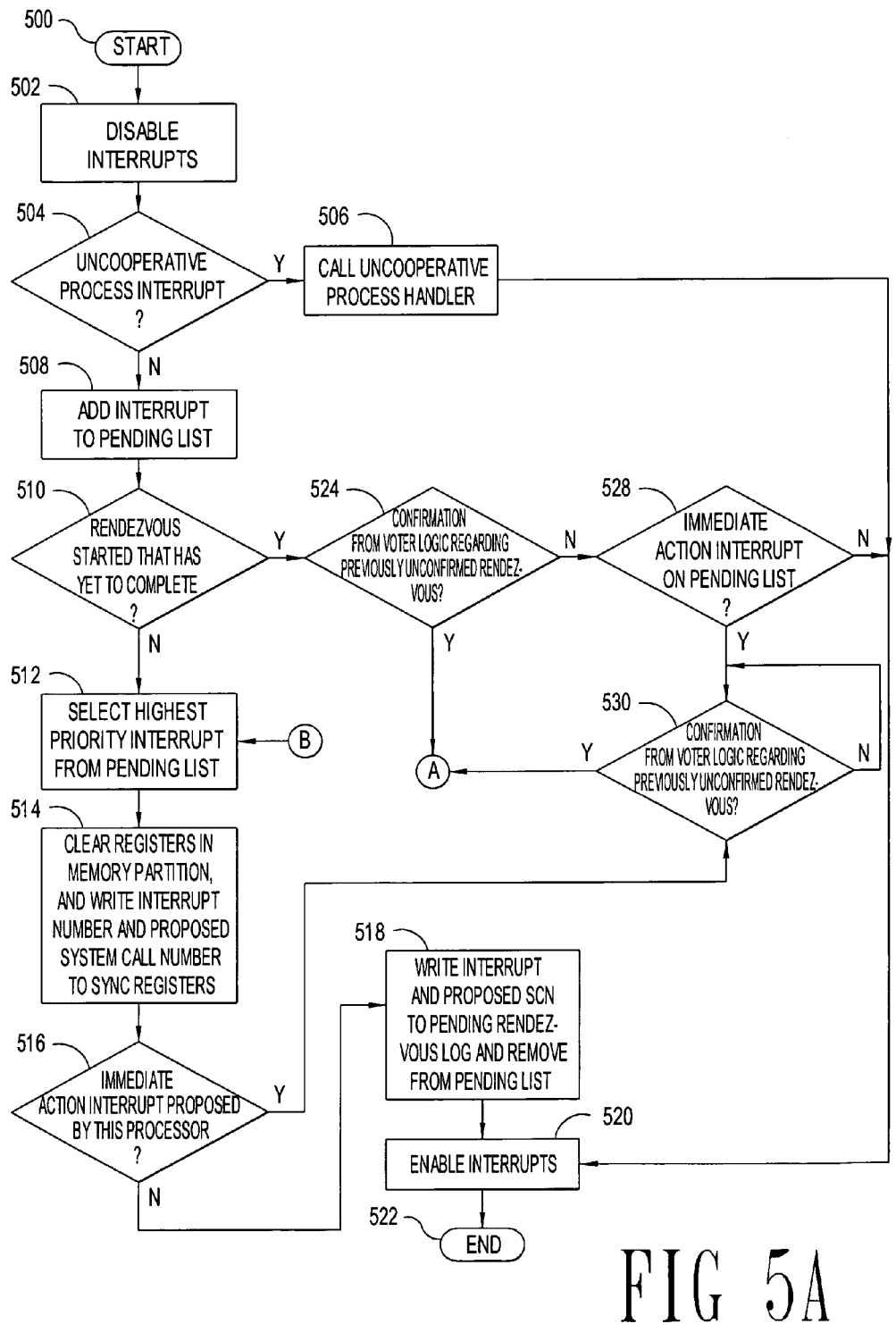
FIGS. 5A and 5B illustrates a flow diagram that may be implemented by an interrupt handler routine in accordance with embodiments of the invention.

FIG. 5 (comprising 5A and 5B) illustrates a flow diagram of an interrupt handler routine in accordance with embodiments of the invention. The process may start (block 500) by the assertion of an interrupt and execution of the interrupt handler routine. The next steps may be disabling interrupts (block 502), followed by a determination of whether the interrupt that triggered the interrupt handler was the expiration of an uncooperative process timer (block 504). If an uncooperative process timer caused this instance of the interrupt handler, an uncooperative process handler is called (block 506). Uncooperative processes, and how to handle them in accordance with embodiments of the invention, are discussed more fully below with respect to FIG. 12. Assuming that the interrupt is not caused by expiration of the uncooperative process timer, the triggering interrupt is added to the pending list (block 508), including an indication of the interrupt type. In systems implementing processors from the Itanium® processor family, determining the interrupt type may be accomplished by reading the interrupt vector register (IVR). Thus, the pending list is a list of interrupts that have been asserted, but for which the process of scheduling a rendezvous point has yet to begin.

The next step in the illustrative process may be a determination of whether there has been an attempt to schedule a rendezvous point that has yet to complete (block 510). From the point of view of a processor, scheduling a rendezvous may be a two step process: writing proposed rendezvous information to the synchronization registers 54; and receiving confirmation from some or all the processors of the logical processor. Scheduling of a rendezvous point that has yet to complete may thus be the situation where data has been written to the synchronization registers 54 that has yet to be returned, or for which data has been returned but has yet to be analyzed. If there is not an outstanding attempt to schedule a rendezvous point, the illustrative method may select the highest priority interrupt from the pending list (block 512), which could be the triggering interrupt or other higher priority interrupt previously placed in the pending list. Alternative embodiments may select a plurality of the highest priority interrupts from the pending list. Thereafter, the registers 57 in the memory partition (to which the voter logic will eventually write data) are cleared, and the interrupt number and proposed system call number at which to service the interrupt are written to the synchronization registers 54 (block 514). The system call number may be a number residing within the memory partition 52 of each processor (as illustrated in FIG. 3 by location 72) which indicates how many system calls have been made from an arbitrary starting point. In accordance with at least some embodiments of the invention, the proposed system call number may be the current system call number incremented by one. Incrementing the system call number by more than one to create the proposed system call number is also within the scope and spirit of the invention. Writing of the interrupt identifier and the proposed system call number (block 512) is illustrated in FIG. 4 by line 60 (for processor PA1) and line 62 (for processor PB1).

Bypassing for now a discussion of immediate action interrupts, after writing the synchronization registers, the next step in the process may be writing the interrupt number and proposed system call number to a pending rendezvous log and remove the interrupt(s) from the pending list (block 518). The pending rendezvous log is thus a list of interrupts for which proposals have been made, but for which either confirmation has yet to be received, or for which no agreement has been reached. Once confirmation is received from the voter logic that the other processors agree, the program implementing FIG. 5, as well as other programs (in particular system call programs as discussed with respect to FIG. 7), clear the entry from the pending rendezvous log. In accordance with at least some embodiments of the invention, the pending rendezvous log may be a set of memory locations 46 within each processor's memory partition (see FIG. 3). Thereafter, interrupts are enabled (block 520), and the interrupt handler process ends (block 522). The discussion now turns to immediate action interrupts in the context of the interrupt handler routine.

Figure 5B:
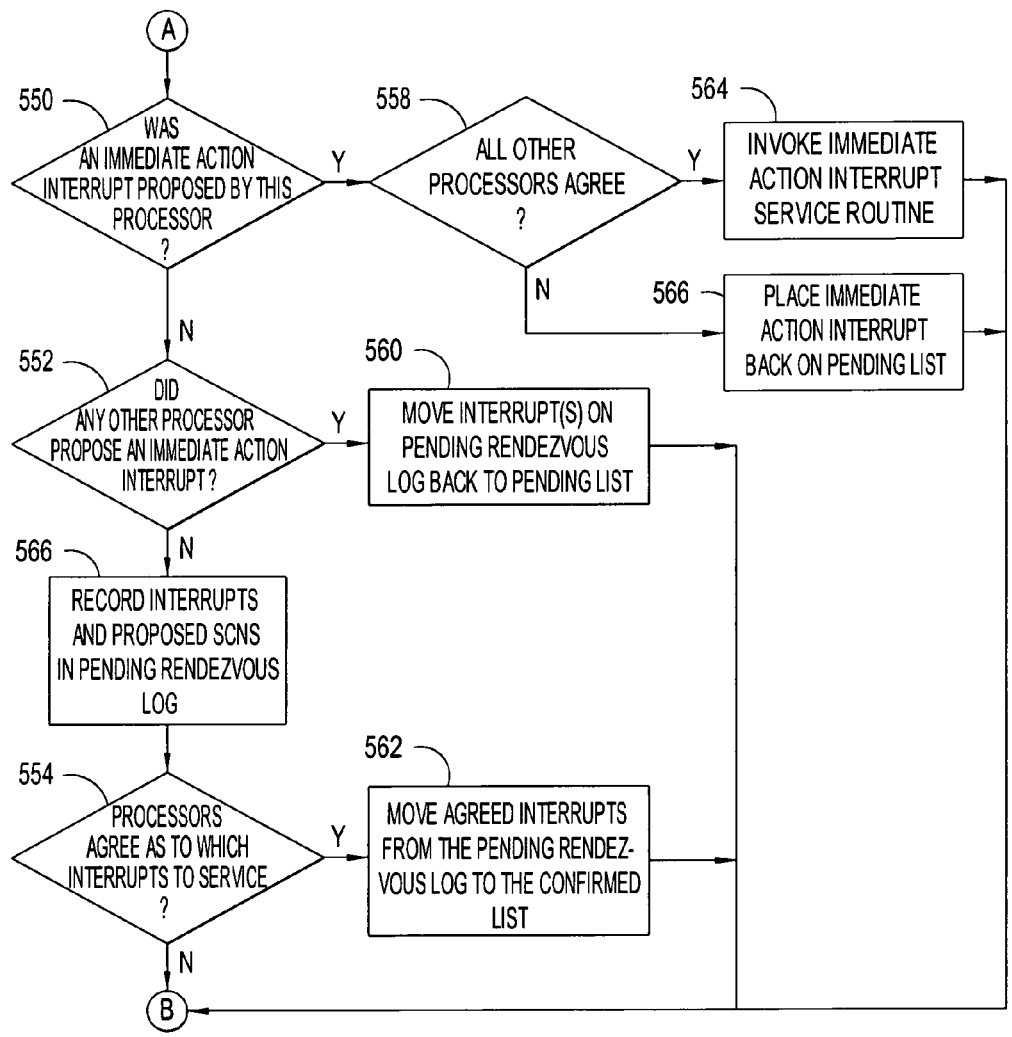

As discussed with respect to FIG. 4, user programs may resume execution after assertion of an interrupt, thus giving time for the processors to agree as to which interrupt to service, and a system call number at which to service the interrupt. However, some interrupts need to be serviced immediately (without allowing the user program to continue), and thus may be referred to as "immediate action interrupts." Immediate action interrupts may comprise page faults, as well as actions to correct uncooperative processes. Interrupts that are not of the immediate action type may comprise input/output (I/O) completion interrupts, queued event interrupts, and software event interrupts to exchange information between processors during boot operations. Returning to the determination of whether there has been an attempt to schedule a rendezvous point that has yet to complete (block 510), if there is an outstanding attempt to schedule a rendezvous point, the next step may be checking whether the voter logic has written back information regarding a previously unconfirmed rendezvous point (block 524). If the voter logic has yet to write back data (block 524), the next step may be a determination of whether there is an immediate action interruption the pending list (block 528). If no immediate action interrupt is on the pending list (block 528), interrupts are enabled (block 520) and the process ends (block 522) because the scheduling of the rendezvous point for the previous interrupt has yet to complete, and in accordance with some embodiments only one scheduling attempt may be active at any one time. If, on the other hand, there is an immediate action interrupt on the pending list (block 528), the process waits in a software loop (block 530) for write back of data from the previous scheduling attempt. When the voter logic writes the data back to the registers 57, the process moves to the illustrative method steps of FIG. 5B. Likewise, If there is an outstanding attempt to schedule a rendezvous point (block 510), and the voter logic has written back data (block 524), the illustrative method steps of FIG. 5B are invoked. The illustrative process may also arrive at waiting in a software loop (block 530), and subsequently the illustrative steps of FIG. 5B, by way of a determination of whether the interrupt just proposed was an immediate action type (block 516).

FIG. 5B illustrates steps taken in response to return of data from the voter logic. In particular, a determination is made as to whether an immediate action interrupt was proposed (block 550) in this execution of the interrupt handler. If this illustrative sub-process was entered by way of block 524 (of FIG. 5A), then an immediate action interrupt was not previously proposed by this processor. If, however, this illustrative sub-process was entered by way of block 530 (of FIG. 5A), then either an immediate action interrupt was previously proposed, or there is an immediate action interrupt on the pending list. If the previously proposed interrupt by this processor was not an immediate action type, a determination is made as to whether other processors proposed servicing of an immediate action interrupt (block 552). If so, the interrupt on the pending rendezvous log is moved back to the pending list (block 560), and execution resumes with selecting the highest priority interrupt from the pending list (block 512 of FIG. 5A). If other processors of the logical processor did not propose servicing an immediate action interrupt (again block 552), a notation is made on the pending rendezvous log as to the interrupts and system call numbers at which to service those interrupts proposed by the other processors (block 553). Thereafter, a determination of whether the processors agree as to the which interrupt to service (block 554). For interrupts for which there is agreement, the one or more interrupts on the pending rendezvous log for which there is agreement are moved to the confirmed list (block 562), and execution resumes with selecting the highest priority interrupt from the pending list (block 512 of FIG. 5A). Thus, except for the case where another processor proposes an immediate action interrupt (block 552 and 560), once placed on the pending rendezvous log interrupts will there remain until there is agreement of the processors to service the interrupts.

Still referring to FIG. 5B, and returning to block 550, if the previously proposed interrupt was an immediate action type (entry through block 530), then data returned by the voter logic is analyzed to determine if other processors in the logical processor likewise proposed servicing the immediate action interrupt (block 558). If so, an appropriate immediate action interrupt service routine is invoked (block 564) and its indication removed from the pending list, and upon return from the service routine execution resumes with selecting the highest priority interrupt from the pending list (block 512 of FIG. 5A). If the processors do not agree, the immediate action interrupt is placed back on the pending list (block 566), and execution resumes with selecting the highest priority interrupt from the pending list (block 512 of FIG. 5A). In this case however, the immediate action interrupt just placed on the list will be the highest priority interrupt, and thus the interrupt handler routine of FIG. 5 immediately again begins the process of getting the processors of the logical processor to agree to service the immediate action interrupt.

FIG. 6 illustrates a flow diagram of the process that may be implemented within the synchronization logic 18 to perform its portion of scheduling the rendezvous point. The steps illustrated in FIG. 6 may be implemented either in software executed on a processor or a microcontroller as part of the synchronization logic (not specifically shown), or the process may be implemented in hardware, possibly by way of an application specific integrated circuit (ASIC) designed as a state machine to implement the illustrative steps. The process starts (block 600), and moves to a determination of whether there is data in the trigger register of the synchronization registers 54 (block 602). In some embodiments, the synchronization logics 18 may be unaware of whether data written is "new" or "old." In these embodiments, of the registers 54 to which each processor writes, at least one may act as a trigger register, starting a timer as part of the process to wait for data from all processors before writing at least some of the data received to each processor. In alternative embodiments, the synchronization logics 18 may be sufficiently sophisticated to be able to compare data to determine whether it is "old" or "new."

Once a processor writes a trigger register (block 602), a determination is made as to whether there is more than one processor in the logical processor (block 603). For example, if one processor fails in a duplex system, the logical processor may be operating with only a single processor. Likewise, if two processors fails in a tri-modular system, the logical processor may be operating with only a single processor. In the event only one processor is active in the logical processor, the data may be immediately written back (block 618).

Assuming that more than one processor is active within the logical processor, a timer is started (block 604) and a determination is made as to whether a second processor of the logical process writes its respective trigger register (block 606). If not, the process waits in a software loop (blocks 606 and 608) until the trigger register is written or the timer expires. If there are more than two processors in the logical processor (block 610), the timer is restarted (block 612) and again the process waits in a software loop (blocks 614 and 616) until the trigger register for the third processor is written or the timer expires. The method of FIG. 6 is illustrative of a logical processor comprising three processors. If more processors are present, additional timer restarts and waits in a software loop may be added. Likewise, if a logical processor comprises only two processors, the steps associated with the third processor may be omitted. If all data has been received, at least some of the data is written to each logical processor (block 618), along with time of day data. If one of the processors fails to write its respective trigger register before expiration of the timer, at least a portion of the data that was written to the synchronization logic 18 is written back to each processor (block 620). In addition to writing the data supplied by the processors, a status word may also be written to each memory partition; the status word indicates that the operation is complete, an indication of which processors took part in the operation, and which processors (if any) timed out (again block 620). If one processor fails to write in the allotted time, the offending processor is removed from the logical processor (block 622), and the illustrative process begins anew. In accordance with at least some embodiments of the invention, if a processor does not write data to the synchronization register within a few milliseconds of the first processor, then corrective action should be taken.

Because the logical processors of the various embodiments implement loosely lock-stepped execution, the times at which the interrupt handler routines (and as we shall later see, the system calls) of each processor writes data to the synchronization register 54 may not precisely align. Thus, the combination of blocks 604-616 allow a certain amount of leeway in which all the processors may detect and react to the interrupts. Referring briefly to FIG. 3, the confirmation data write from the synchronization registers back to each processor may involve copying the data from the synchronization registers 54 to a location in each memory partition, e.g., location 57A and 57B. In accordance with at least some embodiments of the invention, the data written to the memory partitions by the voter logic 56 is aligned with the natural cache block alignment of the host processor.

Summarizing before continuing, an interrupt triggers execution of the interrupt handler routine. The hashed areas 59 in FIG. 4 represent execution of the interrupt handler routine and thus that the user program is suspended momentarily. Assuming there is not a currently incomplete attempt to schedule the rendezvous point, the interrupt handler writes an interrupt identifier, along with a proposed system call number at which to service the interrupt, to the synchronization registers 54 in the voter logic 56 (see lines 60 and 62 of FIG. 4; block 514 of FIG. 5). Once each processor within a logical processor writes its information, voter logic 56 writes at least some of the information to the location 57 in the memory partition of each processor (see line 65 of FIG. 4; blocks 618 or 620 of FIG. 6). At the system call having the appropriate system call number, an interrupt service routine for the interrupt is placed in the scheduler queue and serviced.

Figure 7:
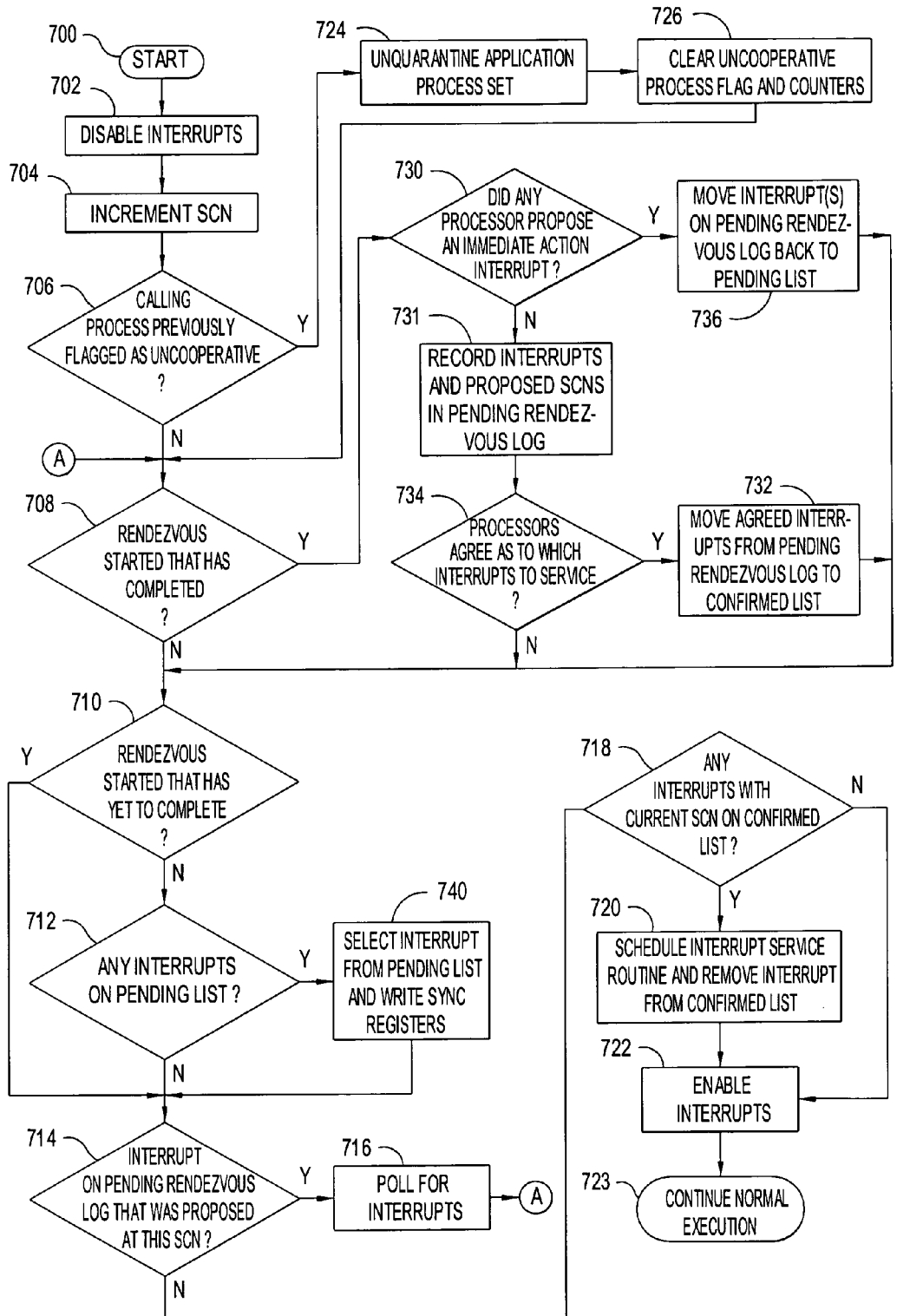
FIG. 7 illustrates a flow diagram that may be implemented by a system call in accordance with embodiments of the invention.

FIG. 7 illustrates at least a portion of the steps implemented by at least some system calls to act as a rendezvous point and to coordinate interrupt handling, in addition to the system call's normal task, e.g., retrieving a time of day. Thus, the method steps presented in FIG. 7 do not purport to be the entire set of steps that any one system call may perform; rather, the illustrative flow diagram highlights the additional steps that at least some of the system calls may perform in order to coordinate interrupt handling and in some cases achieve synchronization of the loosely lock-stepped processors. The process may start (block 700) by a user program issuing a system call, such as a request for the current time of day or for a memory allocation. Thereafter, the system call program may disable interrupts (block 702) and increment the system call number (block 704) so that the particular processor knows which system call number it is currently executing. Skipping for now uncooperative processes (blocks 706, 724 and 726), the next step in the process may be a determination of whether there has been an attempt to schedule a rendezvous point that has completed (block 708), which may be determined by checking for non-zero data in registers 57. If so, the next step may be a determination of whether any other processors proposed servicing an immediate action interrupt (block 730). If so, the interrupt on the pending rendezvous log is moved back to the pending list (block 736). In some embodiments, it is assumed that trigger for the immediate action interrupt seen in the other processor(s) will be forthcoming in the instant processor, and thus the situation is ignored and further attempts to schedule a rendezvous point may take place (beginning with the determination of block 712). In alternative embodiments, processing may begin to address the anticipated error that triggered the immediate action interrupt (not specifically shown).

Returning to block 730, if other processors did not propose servicing an immediate action interrupt, the next step may be recording the interrupts and proposed system call numbers of the other processors in the pending rendezvous log (block 731). Thereafter, a determination of whether the processors agree as to which interrupt to service (block 734) is made. If there is agreement, the interrupt is moved from the pending rendezvous log to the confirmed list (block 732), and further attempts to schedule a rendezvous point may take place (beginning with the determination of block 712). The confirmed list is a list of interrupts for which confirmation has been received that the interrupt should be serviced, and at what system call number the interrupt should be serviced. If the processors disagree as to which interrupt to service (block 734), e.g., one processor proposes servicing interrupt 5 while a second proposes servicing interrupt 9, then the situation will be rectified at future proposals, and further attempts to schedule a rendezvous point may take place (beginning with the determination of block 712).

If a rendezvous has not completed (block 708), the next step may be a determination of whether there has been a rendezvous started that has yet to complete (block 710). Skipping for a moment an analysis of the pending list (block 712), the next step in the illustrative process may be checking whether there are any interrupts on the pending rendezvous log that were proposed for the current system call number (block 714). If so, the illustrative program polls for interrupts (block 716) (because interrupts are disabled by block 702), and the process waits in a software loop (starting with the determination of block 708). In this situation, the system call number proposed by the instant processor may be the highest system call number, and therefore the processor waits in a software loop for confirmation.

If there are no interrupts on the pending rendezvous log that were proposed to be serviced at the current system call number (block 714), the next step may be a determination of whether there are any interrupts on the confirmed list scheduled for the current system call number (block 718). Interrupts on the confirmed list scheduled to be serviced at the current system call number thus each have a their interrupt service routines scheduled for execution and their entries removed from the confirmed list (block 720), interrupts are enabled (block 722), and the system performs its normal activity (e.g., a time of day call) (block 723). Referring briefly to FIG. 4, where the current system call program ends (hatched areas 64 and 66), the one or more interrupt service routines placed in the task scheduler execute, as indicated by hatched areas 67. Alternatively, the interrupt service routine may execute prior to the performing the primary function of the system call. If there are no interrupts on the confirmed list having a rendezvous at the current system call number (block 718), interrupts are enabled (block 720), and the system performs its normal activity (block 723).

In accordance with at least some embodiments of the invention, after at least one interrupt number and proposed system call number are written to the voter logic and the same information is written to the pending rendezvous log (blocks 514 and 518 of FIG. 5), no further proposals for rendezvous points may be started until the voter logic returns the data. Thus, some interrupts may be placed on the pending list (block 508 of FIG. 5) for future scheduling. With the write to the confirmed list (block 732), the return to the pending list of an interrupt on the pending rendezvous log (block 736), or the disagreement as which interrupt to service (block 734), there exists an opportunity to begin again the rendezvous point scheduling process. For this reason, the system call program may perform a similar effort as the interrupt handler, and determine if any interrupts need to be scheduled for service by checking the pending list (block 712). If there are interrupts that need to be scheduled, the system call performs the initial phase of the scheduling process, including writing the proposed rendezvous information to the synchronization registers 54 (block 740). The steps involved in performing the initial phase of the rendezvous scheduling are illustrated in greater detail in FIG. 5, blocks 512, 514, 516, 530 and 550-566. These same steps may be performed by the system call program, but are combined into a single entry in the illustrative method (block 740) so as not to unduly complicate the figure.

Figure 8:
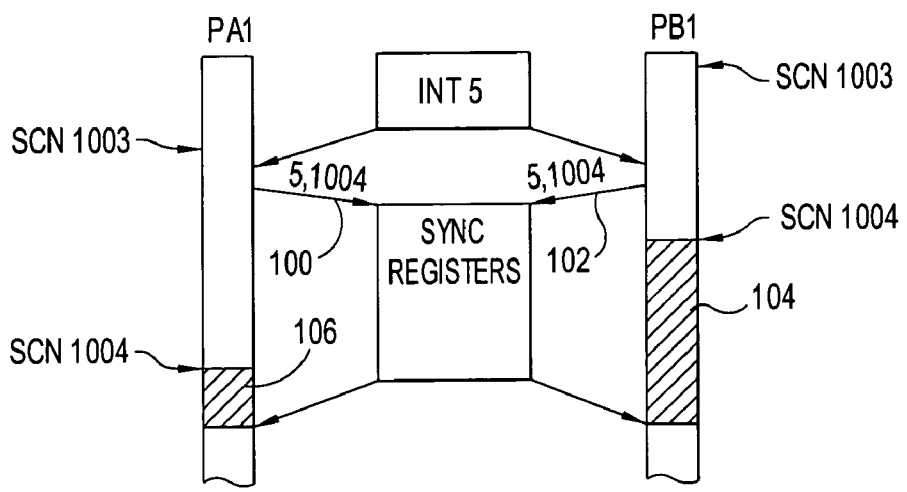
FIG. 8 illustrates a timeline in accordance with embodiments of the invention.

FIG. 8 illustrates a situation that may be encountered where one processor of a logical processor sees an interrupt before another, yet they agree at which system call number the interrupt should be serviced. In particular, processor PA1 performs system call number 1003 just prior to assertion of the interrupt, whereas processor PB1 performs system call number 1003 well before the assertion of the interrupt. Both processors propose that the exemplary interrupt 5 be serviced at system call number 1004, as indicated by lines 100 and 102. In this exemplary case, however, processor PB1 reaches system call number 1004 prior to writing of the synchronization data back to the processors by the voter logic 56. In this case, processor PB1 waits in a software loop (blocks 708, 710, and 714 of FIG. 7), as indicated by shaded area 104, until data is written back that confirms that the interrupt will be serviced at system call number 1004. Likewise, prior to writing by the voter logic, processor PA1 reaches system call number 1004, and likewise processor PA1 waits in a software loop (again blocks 708, 710 and 714 of FIG. 7), as indicated by the shaded area 106. When the voter logic associated with the exemplary two processors writes the gathered information back to the memory partition of each of the processors, and the system call programs confirm that system call number 1004 is where the interrupt should be serviced (blocks 732 and 734 of FIG. 7), both processors service the interrupt (block 720 of FIG. 7) and continue normal processing. Note how the two processors, while initially somewhat divergent in terms of their execution point, become at least partially synchronized upon the writing of the synchronization registers from the voter logic and subsequent servicing of the interrupt.

Figure 9:
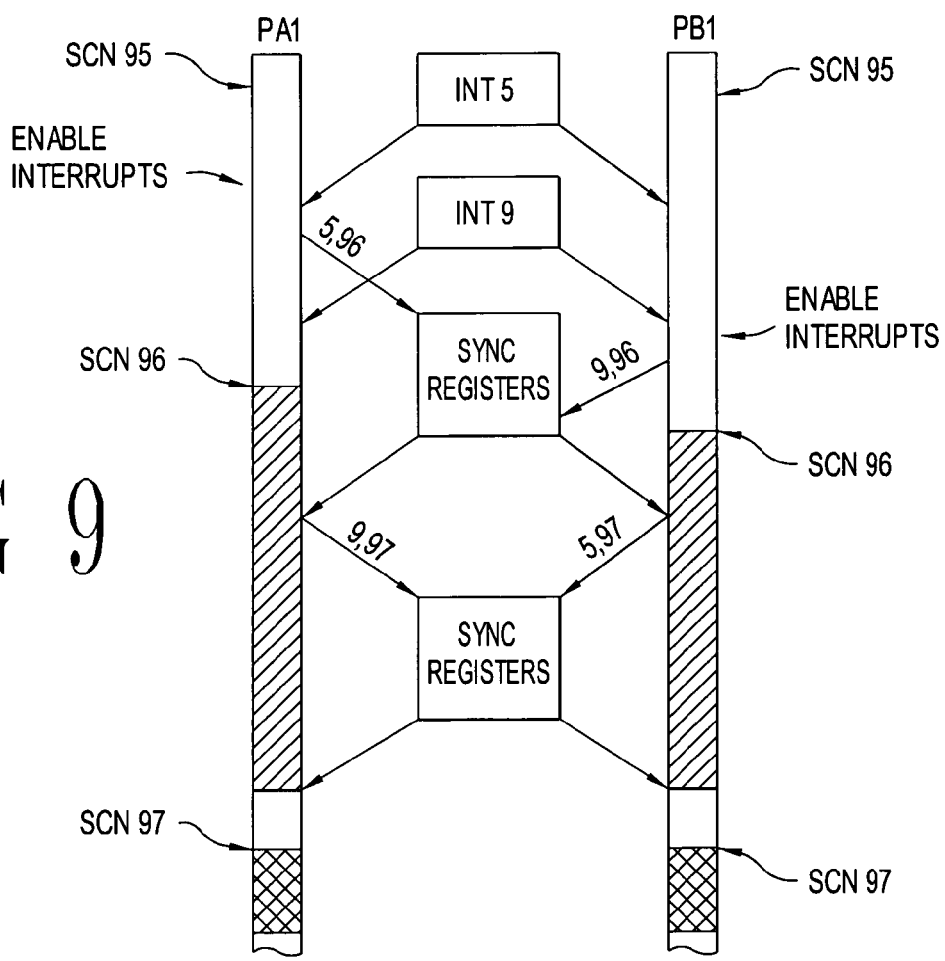
FIG. 9 illustrates a timeline in accordance with embodiments of the invention.

FIG. 9 illustrates a situation in which processors of a logical processor propose or advertise servicing of different interrupt numbers. In the illustrative case shown in FIG. 9, the processor PA1 has its interrupts enabled just prior to the assertion of interrupt 5, and therefore processor PA1 proposes servicing interrupt 5 at system call number 96. However, processor PB1 does not enable its interrupts until after assertion of interrupts 5 and 9. Assume for purposes of explanation that interrupt 9 is of higher priority than interrupt 5. After enabling of interrupts, therefore, processor PB1 proposes servicing interrupt 9 (because of its higher priority) at illustrative system call number 96. Because processor PA1 in this case reaches system call number 96 prior to writing of the data from the synchronization registers back to the memory partition, processor PA1 waits in a software loop (blocks 708, 710 and 714 of FIG. 7). Likewise, processor PB1 reaches system call number 96 prior to confirmation of whether its proposed interrupt 9 will be serviced at system call number 96, and likewise it too waits in a software loop for confirmation. When the voter logic writes the synchronization data back to each processor's memory partition, each processor notes an interrupt type mismatch (one processor proposed servicing interrupt 5 while the second processor proposed servicing interrupt 9) (block 734 of FIG. 7). In each case, the processors then propose their highest priority interrupts not previously proposed (blocks 712 and 740 of FIG. 7). In the case of illustrative PA1, interrupt 9 is the highest priority interrupt, and thus it is proposed. Moreover, since processor PA1 had previously proposed servicing of interrupt 5 at system call number 96, and that proposal is still outstanding, the system call continues to wait in a software loop (blocks 708, 710 and 714, of FIG. 7). With regard to illustrative processor PB1, the highest priority interrupt not previously proposed is interrupt 5, and thus interrupt 5 is proposed (blocks 712 and 740 of FIG. 7). With the write back of data from the second illustrative write of FIG. 9, the processors agree to servicing of both interrupts 5 and 9 at the highest proposed system call number, in this case 97. When system call number 97 occurs in each processor, the interrupts are serviced (blocks 718 and 720), highest priority interrupt first.

Figure 10:
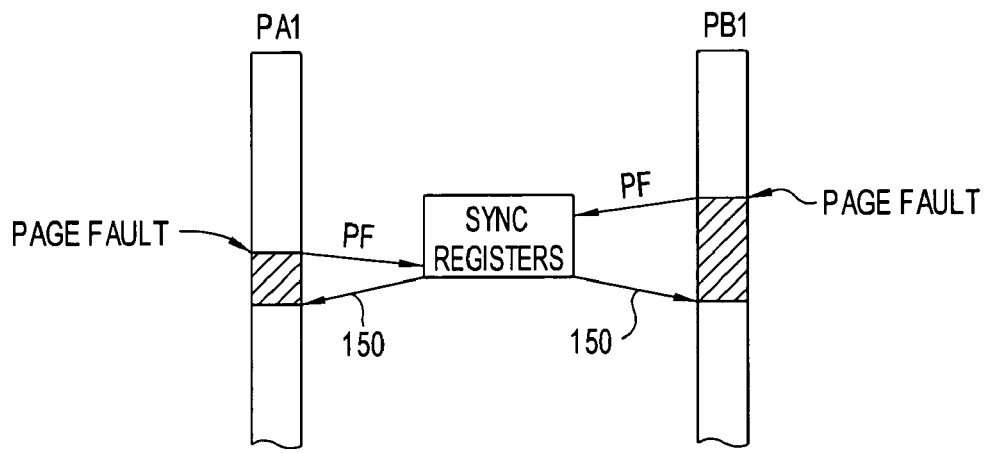
FIG. 10 illustrates a timeline in accordance with embodiments of the invention.

In the illustrative systems of FIGS. 4, 8 and 9, each of the interrupts asserted is an event-type interrupt, meaning that the interrupt signifies an event but immediate action may not be required. However, immediate action interrupts are handled differently. FIG. 10 illustrates a time line of handling of immediate action interrupts, such as page faults, in accordance with embodiments of the invention. In the illustrative case of FIG. 10, processor PB1 experiences an immediate action interrupt, in this illustrative case a page fault (PF). The interrupt handler routine is triggered, the immediate action interrupt nature is determined (block 516 of FIG. 5), and an indication of the immediate action interrupt is written to the synchronization registers (block 514 of FIG. 5). In accordance with embodiments of the invention, the processor PB1 does not do further execution of the user program, but rather waits in a software loop for confirmation that the other processors have also reached the page fault (blocks 530 of FIG. 5). Still referring to FIG. 10, at some time after the page fault for processor PB1, the processor PA1 experiences the corresponding page fault, its interrupt handler routine is triggered, and an indication of the page fault is sent to the synchronization registers. Once the voter logic receives the data from each processor (or one of the processors times out), that information is written to the memory partitions of each processor (block 618 or 620 of FIG. 6), as exemplified by lines 150. Once the interrupt handler routine confirms that all processors agree on the immediate action interrupt (block 558 of FIG. 5), each interrupt handler routine schedules for execution an interrupt service routine for the immediate action interrupt (block 564 of FIG. 5). After completing the interrupt service routine for the immediate action interrupt, the interrupt handler begins anew scheduling of a rendezvous point (beginning with block 512 of FIG. 5). In the illustrative case of a page fault, the interrupt service routine for the immediate action interrupt may be a page fault service routine. Notice, with reference to FIG. 10, that processing stops in each processor until confirmation that all the processors have reached the point in the user program where page fault occurs.

Figure 11:
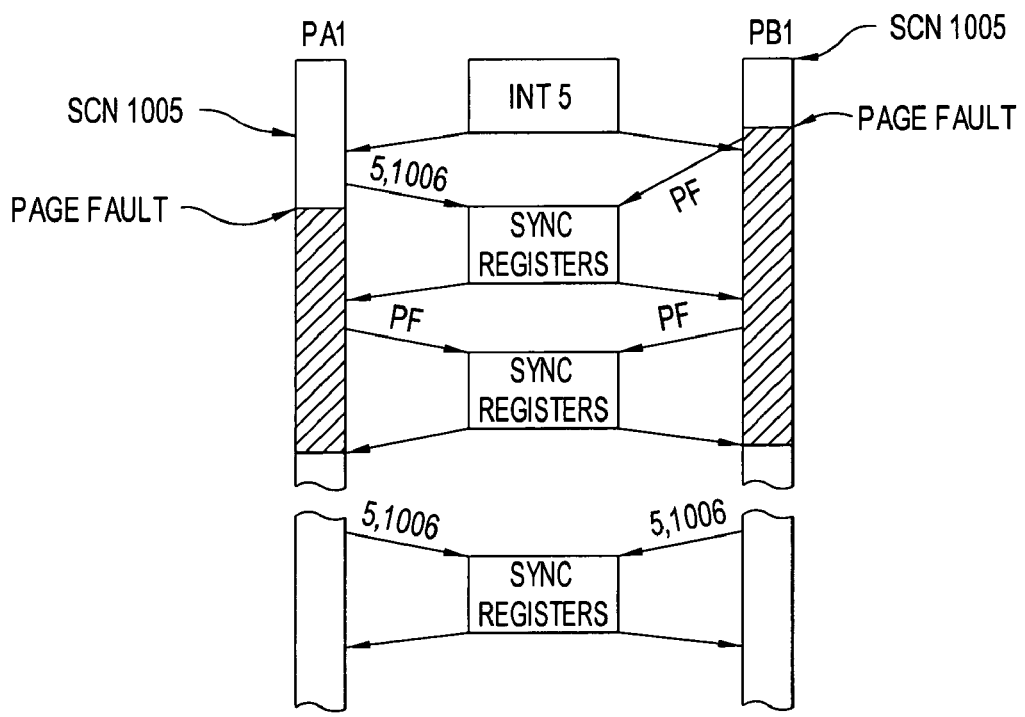
FIG. 11 illustrates a timeline in accordance with embodiments of the invention.

FIG. 11 illustrates the relative treatment of event interrupts and immediate action interrupts. In particular, FIG. 11 illustrates that in the exemplary system having two processors PA1 and PB1, processor PA1 receives indication of interrupt 5 prior to a page fault interrupt, whereas processor PB1 receives the interrupt 5 after the page fault interrupt. In this case, the interrupt handler routine executing on processor PA1 writes a proposal to service interrupt 5 at system call number 1006 (block 514 of FIG. 5). However, the interrupt handler routine executing on processor PB1 (based on the page fault) proposes servicing the page fault, and waits in a software loop until that proposal is confirmed (blocks 514, 516 and 530 of FIG. 5). At some time thereafter, processor PA1 sees its page fault. In this exemplary situation processor PA1 has an unconfirmed rendezvous (for interrupt 5), and thus upon the execution of the interrupt handler routine triggered by the page fault the processor waits in a software loop (block 530 of FIG. 5) until the voter logic writes back the synchronization information. The voter logic associated with these two processors writes the information in the synchronization registers back to the memory partitions of each of the processors. However, in this first write of synchronization data to the memory partitions of each processor, one processor proposed servicing interrupt 5 at system call number 1006, while the other processor proposed servicing the page fault. In this case, each processor scrubs the attempt to service the interrupt (for processor PB1, by operation of block 566, and for processor PA1 by operation of blocks 552, 560 of FIG. 5). In each case, the immediate action interrupt is the highest priority interrupt (selected at block 512 of FIG. 5), and thus both processors propose servicing the immediate action interrupt. Thereafter, voter logic 56 writes the information back to the memory partitions of each processor, and this time in the illustration the processors agree that the page fault should be addressed. Once the immediate action interrupt has been serviced, at some later time, and still referring to FIG. 11, each of the processors PA1 and PB1 propose scheduling the previously asserted interrupt 5 at a particular system call number, in this illustrative case system call number 1006. Now that the page fault is cleared, servicing of interrupt 5 at system call number 1006 may take place as described in the other exemplary embodiments. While each of FIGS. 4 and 8-11 show only two processors, it will be understood that the techniques described are equally applicable to computer systems 1000 having three or more processors in each logical processor. The descriptions with respect to FIGS. 4 and 8-11 show two processors so as not to unduly complicate handling of the various event interrupts and immediate action interrupts.

The discussion of scheduling of a rendezvous point shown by FIGS. 4 and 8-11 is limited to scheduling of only one interrupt at a time. For example, FIG. 4 illustrates that each processor writes a single interrupt number, and proposed system call number at which to service the interrupt, to the synchronization registers. In accordance with alternative embodiments, multiple interrupts (and proposed system call numbers at which to service the interrupts) may be written to the synchronization registers in an attempt to schedule a rendezvous point for each interrupt. The various flow diagrams remain unchanged for operation of these alternative embodiments, save that multiple interrupts, in some embodiments three, may be proposed and written to the pending rendezvous log at one time, and likewise multiple interrupts may be moved to the confirmed list.

Further, the various embodiments described to this point utilize three lists: a pending list (interrupts asserted but not yet proposed); a pending rendezvous log (interrupts proposed but for which confirmation has not been received or received but not analyzed); and an agreed or confirmed list (interrupts for which confirmation has been received). Alternative embodiments may use only two lists: the pending list and the confirmed list. In these embodiments, one or more interrupts may be proposed at one time, but the interrupts remain on the pending list until there is agreement among the processors as to a rendezvous point. Once there is agreement for each interrupt, it is moved from the pending list to the confirmed list. Because only one set of proposals to schedule a rendezvous point may be outstanding, these alternative embodiments may set a flag when data is written to the synchronization registers as an indication of the outstanding attempt. Likewise, the flag may be reset when confirmation data is returned from the voter logic. In these alternative embodiments, each interrupt may be proposed multiple times (even in the absence of an immediate action interrupt) before the processors agree to service the interrupt. Thus, in these alternative embodiments each processor analyzes the returned data to see of other processors agree to servicing of one or more interrupts. If there is agreement, the agreed interrupts are removed from the pending list and placed on the confirmed list. For interrupts for which there is no agreement, the returned data is discarded and the process begins anew by selecting the highest priority interrupts from the pending list to propose rendezvous points.

With regard to immediate action interrupts, in the various embodiments described to this point when one processor sees (and proposes) an immediate action interrupt, other processors may continue to propose their highest priority non-immediate action interrupts until such time as they too see the immediate action interrupt. In alternative embodiments, once at least one processor proposes servicing an immediate action interrupt, the remaining processors may refrain from further proposals of non-immediate action interrupts, and instead continue processing until the corresponding immediate action interrupt occurs. Thus, non-immediate action interrupts may accumulate in the pending list of each processor until after the immediate action interrupt is serviced. These alternative embodiments may thus reduce the time it takes for all the processors to reach, agree to, and service the immediate action interrupt.

As discussed above, at least partial synchronization of processors, and coordinated servicing of interrupts, may be accomplished at rendezvous points in accordance with embodiments of the invention. However, there may be user programs that, for extended periods of time, do not make system calls. Therefore, it is possible that processors within a logical processor may significantly diverge with respect to the portion of a user program that they are executing, and further may not have ample opportunity to service interrupts. A user program that does not make system calls with sufficient frequency may be called an "uncooperative process."

Handling of uncooperative processes may, for purposes of explanation, be considered to have four phases. The first phase is identification that a user program is indeed uncooperative. The second phase may be minimizing the likelihood of computational faults that the uncooperative nature of the application causes as between processors in a logical processor, yet allowing the uncooperative process, and other non-related processes, to continue execution in the hope that the process becomes cooperative. The third phase may be taking action to ensure that the uncooperative process in each processor of a logical processor is at the same stage of execution. Finally, the last phase may be modifying the formerly uncooperative process. Each of these phases will be addressed in turn.

In some embodiments, identifying that a user program makes infrequent system calls, and is therefore considered uncooperative, involves the use of a timer. If the user program does not make a system call before the expiration of the timer, then the user program is an uncooperative process. In accordance with some embodiments of the invention, each time the dispatcher program of a processor (operating in the highest privilege state—kernel mode) sets a user program to execution, the dispatcher also starts an uncooperative process timer and stores an indication of the current system call number. At the expiration of the timer, an interrupt is asserted which invokes an uncooperative process handler routine. The uncooperative process handler routine checks whether there has been at least one system call during the period of time defined by the timer, which in some embodiments may be on the order of 100 micro-seconds. In alternative embodiments, system call programs may reset the timer to avoid triggering of the uncooperative process handler routine, but these resets may require costly kernel mode process calls.

Figure 12A:
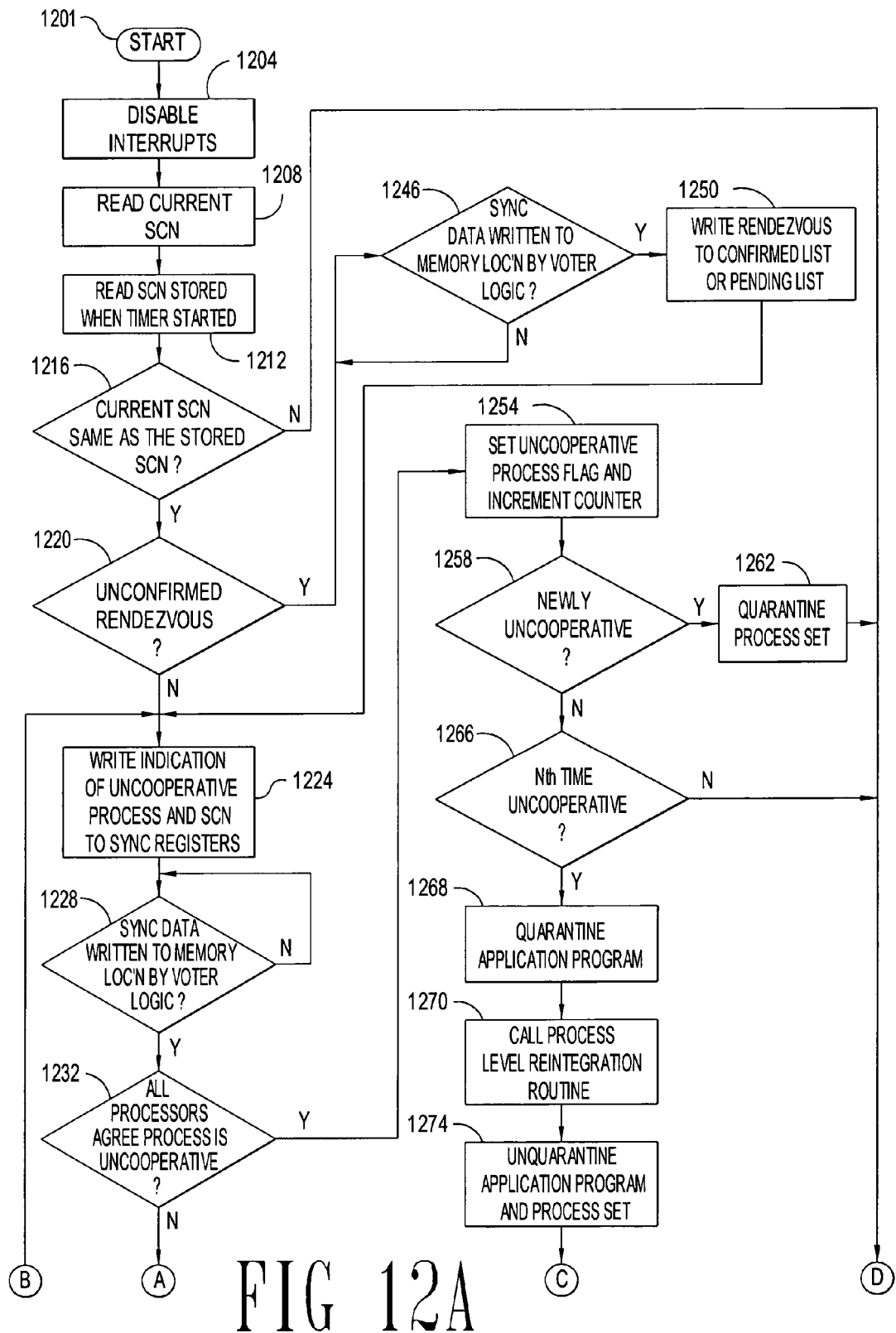
FIGS. 12A and 12B illustrates a flow diagram that may be implemented by an uncooperative process handler routine in accordance with embodiments of the invention.
Figure 12B:
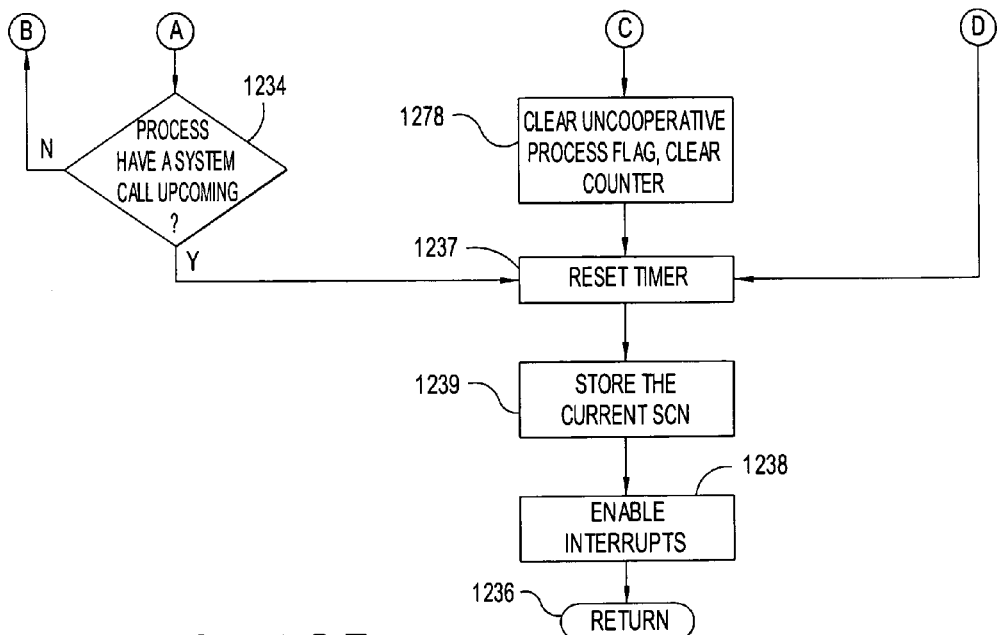

FIG. 12 (comprising 12A and 12B) illustrates a flow diagram of the uncooperative process handler in accordance with embodiments of the invention. In particular, the uncooperative process handler may start (block 1201) by the assertion of an interrupt after expiration of the timer initiated by the dispatcher, hereinafter referred to as the uncooperative process timer. Expiration of the uncooperative process timer may start the illustrative FIG. 12 directly, or the steps of FIG. 12 may be invoked through the interrupt handler by the determination of expiration of an uncooperative process timer (block 504 of FIG. 5) and calling of the handler (block 506 of FIG. 5). After disabling interrupts (block 1204) the uncooperative process handler may read the current system call number (block 1208) and the system call number stored by the dispatcher at initiation (block 1212). The current system call number being the same as the system call number stored at initiation by the dispatcher (block 1216) is indicative that the user program has failed to make a system call during the period of time defined by the timer, and is therefore an uncooperative process. If, on the other hand, the current system call number is not the same as the stored system call number (again block 1216), the process is cooperative and therefore the illustrative method restarts the uncooperative process timer (block 1237), stores the current system call number (block 1239), enables interrupts (block 1238) and ends (block 1236).

In accordance with embodiments of the invention, a user program becoming uncooperative within at least one processor of a logical processor invokes a rendezvous operation to determine if other processors in the logical processor agree to its uncooperative nature. Still referring to FIG. 12, if the current system call number is the same as the system call number stored by the dispatcher (block 1216), the next step may be a determination of whether there is an unconfirmed rendezvous operation (block 1220). If not, the next step may be beginning a rendezvous operation by writing an indication of uncooperative nature of the user program, along with the current system call number, to the synchronization registers 54 in the voter logic 56 (block 1224). Thereafter, the uncooperative process handler routine waits in a software loop for the voter logic to return the synchronization data (block 1228).

Because only one scheduling of a rendezvous point may be in progress at any one time, if there has been a rendezvous started that has yet to complete at the expiration of the uncooperative process timer (again block 1220), the next step may be waiting in a software loop (block 1246) until the voter logic writes the synchronization data. Keeping in mind that the synchronization data written back is with regard to a previous interrupt (not the uncooperative process timer expiration interrupt that triggered the current execution of the uncooperative process handler routine), either rendezvous information is written to the confirmed list for future execution, or the interrupt is moved back to the pending list (block 1250) (see blocks 552, 554, 560, 562 and 556 of FIG. 5). Thereafter, the process proceeds to writing an indication of the uncooperative nature of the user program, along with the current system call number, to the synchronization registers 54 in the voter logic 56 (block 1224) and waits in a software loop for return of the data (block 1228).

If the processors do not agree that the user program is uncooperative (block 1232), an analysis of the synchronization data is made to determine if the user program is cooperative in other processors (block 1234). For example, while the uncooperative process timer in one processor may expire (or roll over) just prior to a system call by the user program, the user program in a second processor of the logical process may make the system call just before expiration. Thus, one processor will indicate that the process is uncooperative, and the second processor will attempt to schedule handling of the next interrupt, including the writing of a proposed rendezvous point. If the analysis reveals the user program will soon make a system call (block 1234), the uncooperative process timer is restarted (block 1237), the current system call number stored (block 1239), interrupts enabled (block 1238) and the process ends (block 1236).

Still referring to FIG. 12, if all the processors of the logical processor agree that the user program is uncooperative (block 1232) (all the processors indicate the user program has been on the same system call number for the uncooperative process timer period), then first stage handling of the uncooperative process begins by setting an uncooperative process flag and incrementing a counter (block 1254). If this is the first time the user program is flagged as uncooperative (block 1258), possibly determined by reading the counter (incremented in block 1254), then the user programs that access the same data values in the same memory locations as the uncooperative process (the uncooperative program's "process set") are placed on a list which disallows their continued execution. Stated otherwise, the dispatcher for the processor will not schedule any member of the process set for execution, also known as a quarantine of the process set (block 1262). Because the process set shares memory with the uncooperative process, and further because of potential disparities in execution point within the uncooperative process as between processors of a logical processor which may cause differences in the shared memory seen by the process set, a quarantine of the process set ensures that no processes in the process set see different data in memory (as between processors), thus causing computational faults. In this first stage, the uncooperative process is still allowed to run in the hope that it will become cooperative. Thus, after a quarantine of the process set, the uncooperative process handler routine restarts the uncooperative process timer (block 1237), stores the current system call number (block 1239), enables interrupts (block 1238) and ends (block 1236).

In accordance with embodiments of the invention, the uncooperative process is allowed to continue execution while its process set remains quarantined. On the next scheduling of the uncooperative process for execution, the dispatcher again stores the current system call number and starts the uncooperative process timer. If the uncooperative process executes again for the uncooperative process timer period without making a system call, the uncooperative process handler routine is again invoked. If all the processors agree again to the uncooperative nature of the user program (block 1232), the routine sets the uncooperative process flag (block 1254) (but this flag was already asserted based on a previous entry), and the counter is incremented (block 1254). Since in this exemplary situation the user program is not newly uncooperative (block 1258), the next step may be a determination of whether user program has been found to be uncooperative for predetermined number of iterations (block 1266). In some embodiments, after quarantine of the process set the user program may be declared uncooperative ten times before further corrective action is taken. If the user program has been confirmed as uncooperative less than the predetermined number of iterations (block 1266), the uncooperative interrupt handler routine restarts the uncooperative process timer (block 1237), stores the current system call number (block 1239), enables interrupts (block 1238) and ends (block 1236), again in the hope that the uncooperative process becomes cooperative before further action is taken. Phase three of the uncooperative process handling will be discussed after discussing how the uncooperative process is treated if a system call is made before the predetermined number of iterations.

Assume for purposes of further explanation that a user program has been confirmed as uncooperative at least once, has had its process set quarantined, but has yet to be confirmed as uncooperative for the predetermined number of iterations. Further assume that the user program makes a system call. Referring again briefly to FIG. 7, when the system call program executes, after incrementing the system call number (block 704), a determination is made as to whether the calling program has been previously flagged as uncooperative (block 706). If not, the system call performs the steps as previously discussed. If, however, the calling program has been previously flagged as uncooperative, the system call program may unquarantine the process set (block 724) and clear the uncooperative process flag (block 726).

Figure 13:
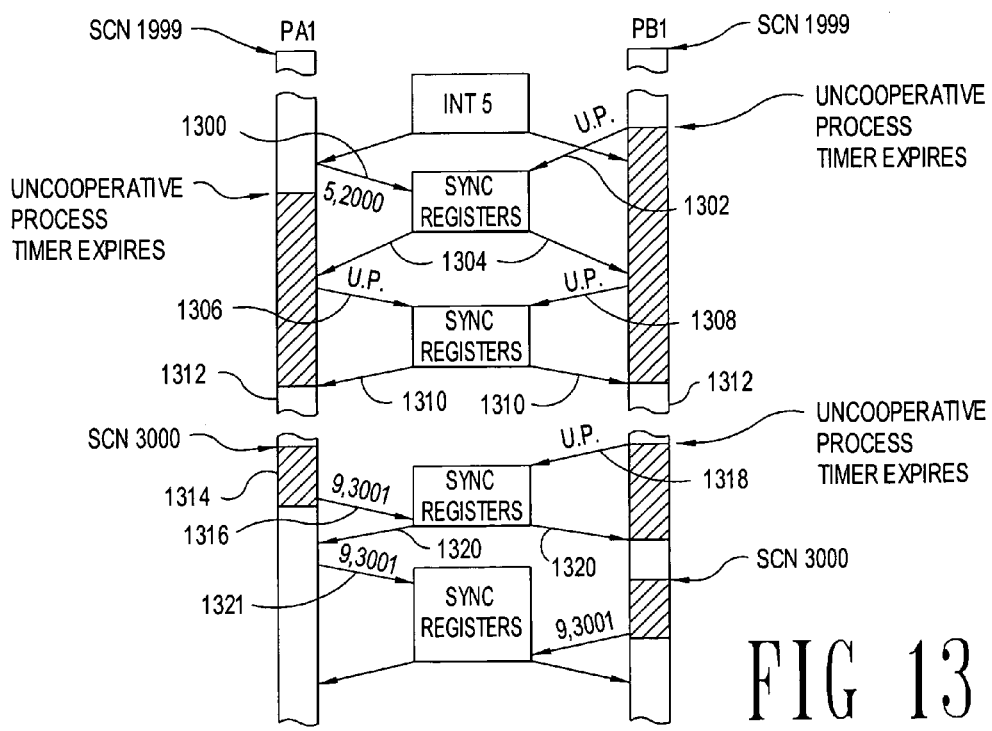
FIG. 13 illustrates yet another timeline in accordance with embodiments of the invention.

FIG. 13 is a timeline illustrating handling of an uncooperative process in relation to event interrupts to further illustrate the methods of FIG. 12. In particular, FIG. 13 illustrates a situation where each processor sees system call number 1999. In the case of processor PA1, interrupt 5 is asserted prior to expiration of the uncooperative process timer, and thus processor PA1 proposes servicing of interrupt 5 at system call number 2000 (line 1300; block 514 of FIG. 5). Soon after proposing service of interrupt 5, the uncooperative process timer for processor PA1 expires, and because of the unconfirmed rendezvous the processor waits in a software loop (block 1246 of FIG. 12) for the voter logic to write back synchronization data from the previous proposal. Processor PB1, by contrast, has its uncooperative process timer expire before the interrupt is asserted, and thus processor PB1 writes uncooperative process information to the synchronization registers 54 (line 1302) and waits in a software loop for confirmation (blocks 1224 and 1228 of FIG. 12). The voter logic then writes the synchronization data back to each processor (line 1304). Because the processors did not agree to servicing of the interrupt, and because of the immediate action nature of uncooperative process interrupts, processor PA1 writes the interrupt 5 back to the pending list (block 1250), writes the indication of the uncooperative process to the synchronization registers (line 1306; block 1224), and waits in a software loop for confirmation (block 1228). With regard to processor PB1, the processors do not agree regarding the uncooperative process (block 1232) (processor PA1 proposed servicing an interrupt rather than an indication that the user program is uncooperative). Moreover, the system call number proposed by processor PA1 (in this exemplary case system call 2000) does not suggest that a system call in processor PB1 is upcoming; rather, the proposed system call number of 2000 implies that processor PA1 is also standing at system call number 1999 (block 1234). Thus, processor PB1 makes a second write of synchronization data indicating an uncooperative process (line 1308; block 1224), and again waits in a software loop for confirmation (block 1228). At some time thereafter, the voter logic 56 writes the synchronization data to each processor (lines 1310). In this exemplary second write, the processors agree to the uncooperative status (block 1232 for each processor), and thus each processor asserts the uncooperative process flag, increments the uncooperative process counter (block 1254), and quarantines the process set for the uncooperative process (block 1262). Thereafter, the user program continues to operate (regions 1312 in each processor time line), albeit with the process set for the uncooperative process quarantined.

FIG. 13 also illustrates a situation where, in spite of a mismatch of synchronization data written to the voter logic, a processor gleans information that the uncooperative nature of the user program may soon end. In particular, FIG. 13 further illustrates processor PA1 making a system call (region 1314), in this exemplary case system call number 3000. As part of the system call process, processor PA1 proposes or advertises the next rendezvous (line 1316; see also blocks 712 and 740 of FIG. 7). Processor PB1, by contrast, has its uncooperative process timer expire prior to the system call, and therefore writes an indication of the uncooperative process (line 1318; block 1224) and waits in a software loop for confirmation (block 1228). When the voter logic returns the synchronization data (lines 1320), processor PA1 sees an interrupt type mismatch (block 730 of FIG. 7 if analyzed by a system call, and block 552 if analyzed the interrupt handler) and attempts again to write synchronization data (line 1321; block 740 of FIG. 7 or block 514 of FIG. 5). Processor PB1, by contrast, receives the synchronization data (line 1320), and while the processors do not agree as the uncooperative nature of the user program (block 1232), the proposed rendezvous information from processor PA1 shows that a system call is upcoming (block 1234). Thus, processor PB1 continues execution of the user program until the system call is made. At some later time the processors agree to the interrupt originally proposed by processor PA1.

Returning now to FIG. 12, and in particular the step illustrated by block 1266. If a user program has been flagged as an uncooperative process for a predetermined number of iterations (block 1266), the next steps may be quarantining the uncooperative process (block 1268), and calling a process level reintegration routine (block 1270).

User programs running in each processor of a logical processor and identified as an uncooperative process may diverge significantly in their execution point as between the processors. In accordance with at least some embodiments of the invention, if the user program will not provide an opportunity to synchronize based on a system call, the synchronization may take place by forcing each user program to resume execution at the same point in the instruction stream. This may mean that some processors duplicatively execute some instructions, and other processors may skip execution of some instructions. However, before allowing the user programs to resume execution at the same point in the instruction stream, the working memory of each processor needs to be the same. Stated otherwise, any memory to which the uncooperative process has write access should be compared as between the processors of the logical processor and made the same. In this way, when execution resumes the process state for each processor will be the same. Thus, in accordance with embodiments of the invention, when the uncooperative process handler routine illustrated in FIG. 12 determines that a forced synchronization is required (block 1266), process level reintegration of the working memory of the user program may be needed.

Figure 14:
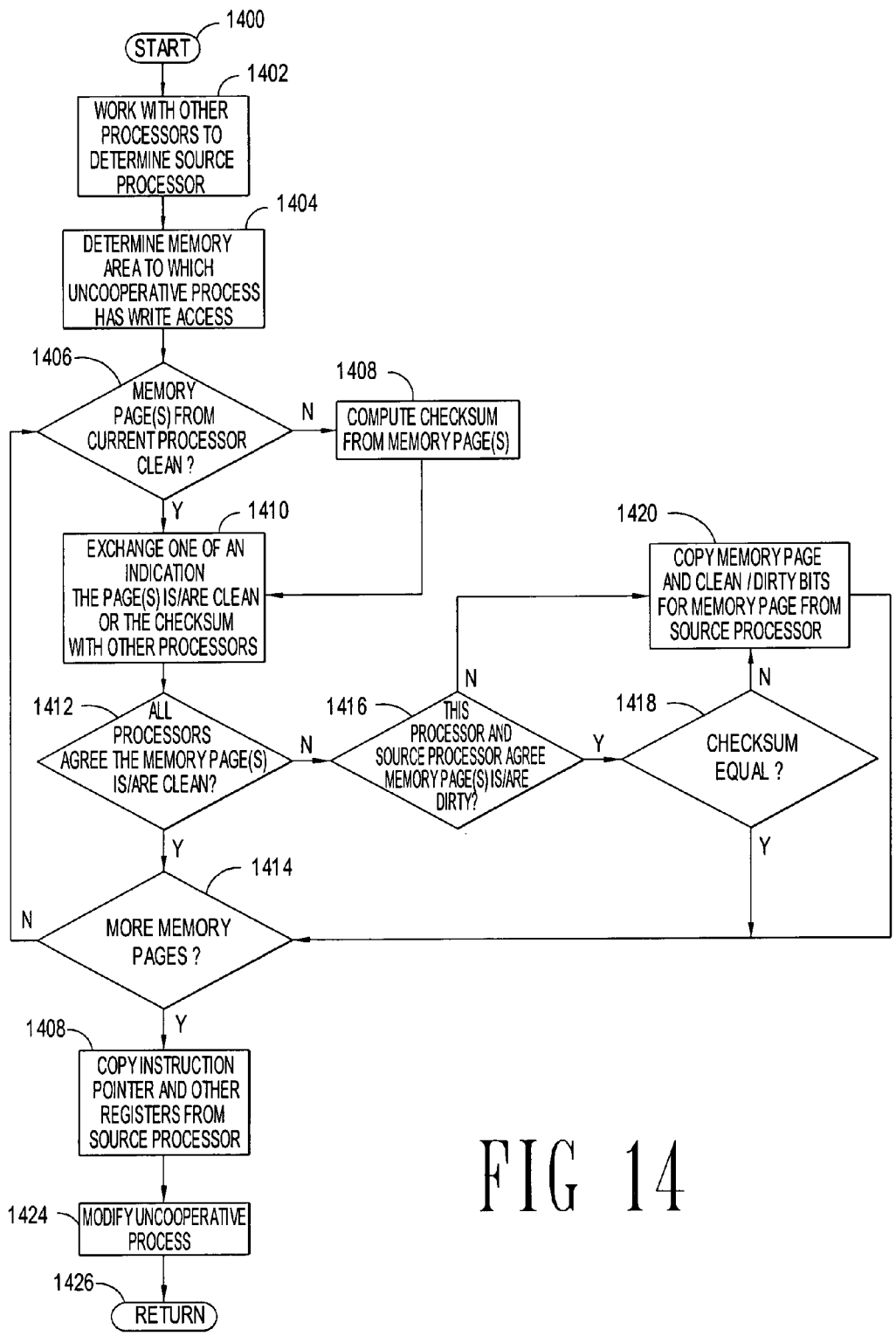
FIG. 14 illustrates a flow diagram that may be implemented by a process level reintegration routine in accordance with embodiments of the invention.

FIG. 14 illustrates a flow diagram of a process level reintegration routine that may be substantially simultaneously executed in each processor of a logical processor. In particular, the process starts (block 1400) based on a call by the uncooperative process handler routine illustrated in FIG. 12. The next step in the illustrative process is working with other processors of the logical processor to select a source processor (block 1402). To select a source processor, messages may be exchanged between the processors using the voter logic. Any one of the processors of the logical processor may be selected.

The next step of the illustrative process is determining the memory area to which the uncooperative process has write access (block 1404). This determination may be made, for example, by referring to the memory management and/or page tables of the processor. Once the extent of the memory area to which the uncooperative process has write access is determined, the next step is a determination of whether a memory page has been unmodified since its creation (otherwise known as clean) (block 1406). The balance of the description of illustrative FIG. 14 assumes that only one memory page at a time is analyzed by the processors; however, alternative embodiments compare a plurality of memory pages at any one time. If the memory page under consideration is not clean (otherwise known as dirty) (again block 1406), the next step of the illustrative process is computing a checksum for the memory page (block 1408).

The next step of the illustrative process is exchanging data (block 1410) being one of an indication that the memory page under consideration is clean (entry through block 1406), or the checksum calculated if the memory page is dirty (entry through block 1408). This exchange of data may take place using the voter logic, and is similar to the exchange regarding an immediate action interrupt in the sense that each processors waits in a software loop for the data to be returned from the voter logic (waiting for each processor to write its respective data, and for the voter logic to write the data back). These steps are not explicitly shown so as not to unduly complicate the figure. Once the data is received, a determination is made as to whether all processors agree that the memory page is clean (block 1412). If all the processors agree the memory page is clean, there is no need to copy the memory page from the source processor, thus the next step may be a determination of whether all the memory pages have been analyzed (block 1414). If not, the process begins anew with the analysis of another memory page.

Still referring to FIG. 14, if all the processors do not agree to the clean status of the memory page (again block 1412), the next step is a determination of whether the processor in which the illustrative process is running and the source processor agree that the memory page is dirty (block 1416). If so, a determination is made as to whether the checksum provided by the source processor and checksum calculated by the processor in which the illustrative process is running are equal (block 1418). If the checksums are equal, there is no need to copy the memory page from the source processor as the memory pages, though dirty, contain the same data. If, on the other hand the checksum as between the source processor and the processor in which the illustrative process is running are not equal (again block 1418), the memory pages are not the same and thus the memory page from the source processor is copied to the processor in which the illustrative process is running (block 1420). Likewise if the source processor and the processor in which the illustrative process is running disagree as the dirty status of the memory page (again block 1416), the memory pages are not the same and thus the memory page from the source processor is copied to the processor in which the illustrative process is running (again block 1420). In addition to copying the memory page from the source processor, the clean/dirty bits associated with the memory page are copied from the source processor. These bits may be stored, for example, in the page table or page mapping table of the source of the processor. It is not necessary to copy the clean/dirty bits in the case where both processors agree as to the dirty state of the memory page; however, it may be convenient, and not too costly from a programming and exchange time standpoint, to copy the bits each time a memory page is copied. After copying, the illustrative method moves to the determination if there are more memory pages to analyze (block 1414).

Once all the pages have been analyzed, and possibly some memory pages copied from the source processor to one or more of the non-source processors, the next step in the illustrative process is copying of the process control block, possibly including the instruction pointer and other registers, from the source processor to the non-source processors (block 1422). This copying ensures that each processor resumes execution of the user program at the same execution point as the source processor. Thereafter, the process level reintegration routines returns (block 1426). It is noted that the process level reintegration routine runs as a process, interleaved with execution of other processes (except those in the quarantined process set).

Once control has returned to the uncooperative process handler illustrated in FIG. 12, the user program, and its process set, are removed from the quarantine list (block 1274), the uncooperative process flag and the counter are cleared (block 1278), the uncooperative process timer is restarted (block 1237), the current system call number stored (block 1239), interrupts enabled (block 1238) and the process ends (block 1236). Thus, the formerly uncooperative process has been synchronized (in this case by a process level reintegration of the writable memory), and may again be executed by the processors. Because the instruction pointer and other registers from the source processor were copied, all the processors resume execution at the same execution point in the user program.

In accordance with at least some embodiments, process level reintegration alone may be sufficient to ensure proper operation in spite of a user program's uncooperative nature. In addition to, or in place of, the process level reintegration, at least some embodiments may take proactive steps to ensure that at least the portion of the user program that caused the uncooperative process designation does not do so again (block 1424). The proactive steps may take many forms. In some embodiments, the offending portion of the user program (most likely a software loop) is modified to contain a system call. This may be accomplished, for example, by replacing no-operation instructions (NOPs) with system calls (e.g., a time of day call). If the user program instruction stream does not allow for mere replacement, an instruction may be replaced with a branch instruction that points to the replaced instruction, a system call, and a return branch instruction. These modifications may be made to the user program as it exists in the main memory and/or made to the user program as it exists on a long term storage device, such as a disk drive. In yet further embodiments, full processor reintegration within a multiprocessor computer system (both processors with cooperative and uncooperative processes) may be used to synchronize the uncooperative processes across multiple processors.

In yet still further alternative embodiments, processor hardware may support a mechanism for insertion of an interrupt at a particular point in the instruction stream, and the interrupt may trigger the system call for synchronization and interrupt scheduling. For example, the Itanium® processor family manufactured by Intel® supports registers within the processor known as "instruction breakpoint registers." The breakpoint registers may be loaded with an instruction pointer value, and when the actual instruction pointer matches value in the breakpoint register, an interrupt is triggered. This exemplary mechanism may thus be used to trigger an interrupt, which in turn triggers a system call for synchronization purposes. The hardware based mechanism may not be available in all architectures, but the embodiments of modifying the user program may have universal application.

In yet still further embodiments, full processor reintegration (copy of all the memory) within a multiprocessor computer system (both for processors with uncooperative processes, and processors whose processes are cooperative) may be used to synchronize the uncooperative processes across the multiple processors of the logical processor.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
executing fault tolerant copies of a user program, one copy of the user program executed in a first processor performing non-deterministic execution, and a duplicate copy of the user program executing in a second processor performing non-deterministic execution;
replicating externally initiated requests directed to the user programs; and
said executing in the first processor and second processor is not in cycle-by-cycle lock-step.

2. The method as defined in claim 1 wherein executing fault tolerant copies of the user program further comprises:
executing the user program in the first processor being part of a first computer system;
executing the duplicate copy of the user program in a second processor being part of a second computer system.

3. The method as defined in claim 1 further comprising exchanging information about the state of the respective user programs using a logic system coupling the first and second computer systems.

4. The method as defined in claim 1 further comprising consolidating input/output (I/O) requests generated by software into single I/O requests presented to an I/O device.

5. The method as defined in claim 4 further comprising providing I/O responses to each of the processors.

6. The method as defined in claim 1 further comprising consolidating responses from each of the processors triggered by the request.

7. The method as defined in claim 1 wherein executing fault tolerant copies of the user program further comprising executing a duplicate copy of the user program in a third processor performing non-deterministic execution, and wherein the executing in the first, second and third processors is not in cycle-by-cycle lock-step.

8. The method as defined in claim 1 wherein the non-determinism comprises at least one selected from the group: timing non-determinism; non-architecturally visible non-determinism; or non-determinism related to error handling in data access.

9. A system comprising:
a first computer system comprising a first processor;
a second computer system comprising a second processor; and
a voter logic system that couples the first and second computer systems;
said processors execute fault tolerant copies of a user program, the first processor executing the user program, and the second processor executing a duplicate copy of the user program;
said execution of the user programs in the first and second processors is not in strict lock-step, and the first and second processors execute their respective user programs non-deterministically; and
said voter logic system receives, from an external device, requests directed to the software executing on each processor, duplicates the requests, and forwards the requests one each to each processor.

10. The system as defined in claim 9 further comprising a third processor coupled to the first and second processors that executes a duplicate copy of the user program, and wherein the third processor is not in strict lock-step with the first and second processor, and wherein the third processor executes its respective user program non-deterministically.

11. The system as defined in claim 9 further comprising wherein the voter logic system receives, from the processors, duplicate read requests directed to an input/output (I/O) device, consolidates the requests into a single request, and forwards the single request to the I/O device.

12. The system as defined in claim 9 further comprising wherein the voter logic system receives, from the processors, duplicate responses to the requests from the external device, consolidates the responses into a single response, and forwards the single response to the external device.

13. The system as defined in claim 9 further comprising wherein the voter logic system receives duplicate write requests directed to an input/output (I/O) device, consolidates the requests into a single request, and forwards the single request to the I/O device.

14. The system as defined in claim 9 wherein the non-deterministic execution of the user program comprises at least one selected from the group: timing non-determinism; non-architecturally visible non-determinism; or non-determinism related to error handling in data access.

15. The system as defined in claim 9 wherein both the first and second processors execute their respective user programs using out of order processing.

16. A system comprising:
a first processor;
a second processor coupled to the first processor;
a synchronization logic that couples the first and second processors, the synchronization logic comprising a register set; and
said the first and second processor exchange data regarding interrupts using the register set;
wherein the processors execute fault tolerant copies of a user program, the first processor executing the user program, and the second processor executing a duplicate copy of the user propram; and
wherein the execution or the user programs in the first and second processors are not in strict lock-step, and wherein the first and second processors execute their respective user programs non-deterministically.

17. The system as defined in claim 16 wherein the first and second processors exchange data by writing data to the register set, and wherein the first and second processors retrieve data from the register set with a waited read.

18. The system as defined in claim 16 wherein the first and second processors exchange data by writing data to the register set, and wherein the synchronization logic writes at least a part of the data in the register set to a memory of each processor.

19. A system comprising:
a first means for processing that executes a user program;
a second means for processing coupled to the first means for processing, the second means for processing executes a duplicate copy of the user program; and
a means for receiving, duplicating and delivering requests from an external device directed to the user program executing on each means for processing, the means for receiving coupled to each means for processing;
wherein the execution of the user programs in the first and second means for processing is for fault tolerance, and is at least partially lock-stepped without fully synchronized clocking signals applied to each means for processing and without relying on counting retired instructions to control synchronism as between the first and second means for processing.

20. The system as defined in claim 19 further comprising a third means for processing coupled to the first and second means for processing that executes a duplicate copy of the user program, and wherein the third means for processing is at least partially lock-stepped with the first and second means for processing.

21. The system as defined in claim 19 wherein the means for receiving further comprises a means for comparing input/output (I/O) requests from the first and second means for processing.

22. The system as defined in claim 19 further comprising:

said means for receiving further comprises a means for assisting in synchronization of the first and second processors; and said first and second means for processing exchange data regarding interrupts using the means for assisting.

23. A system comprising:

a first processor;

a second processor; and a voter logic system that couples the first and second processors;

said processors configured to non-deterministically execute duplicate copies of a user program in other than strict lock-step; and said voter logic system configured to receive from an external device requests directed to the software executing on each processor, duplicate the requests, and forward the requests one each to each processor.

24. The system as defined in claim 23 further comprising the voter logic system further configured to receive, from the processors, duplicate responses to the requests from the external device, consolidate the responses into a single response, and forward the single response to the external device.

25. The system as defined in claim 23 further comprising:

a first computer system comprising the first processor;

a second computer system comprising the second processor; and said voter logic system coupled between the first and second computer systems.

* * * * *

UNITED STATES PATENT AND TRADEMARK OFFICE
CERTIFICATE OF CORRECTION

PATENT NO. : 7,426,656 B2  Page 1 of 1
APPLICATION NO. : 11/042548
DATED : September 16, 2008
INVENTOR(S) : David L. Bernick et al.

It is certified that error appears in the above-identified patent and that said Letters Patent is hereby corrected as shown below:

In column 10, line 55, delete "interruption" and insert -- interrupt on --, therefor.

In column 26, line 34, in Claim 16, delete "propram" and insert -- program --, therefor.

In column 26, line 35, in Claim 16, delete "or" and insert -- of --, therefor.

Signed and Sealed this

Fourth Day of August, 2009

JOHN DOLL
*Acting Director of the United States Patent and Trademark Office*